Oct. 20, 1959   R. N. KNOSP ET AL   2,908,978
DIAL OPERATED MEASURING APPARATUS FOR MACHINE TOOLS
Filed Feb. 3, 1955   13 Sheets-Sheet 1

INVENTORS.
Robert N. Knosp.
BY Carl E. Linden.
Frank O. Wetzel.
Wood, Herron & Evans.
ATTORNEYS.

Oct. 20, 1959 R. N. KNOSP ET AL 2,908,978
DIAL OPERATED MEASURING APPARATUS FOR MACHINE TOOLS
Filed Feb. 3, 1955 13 Sheets-Sheet 2
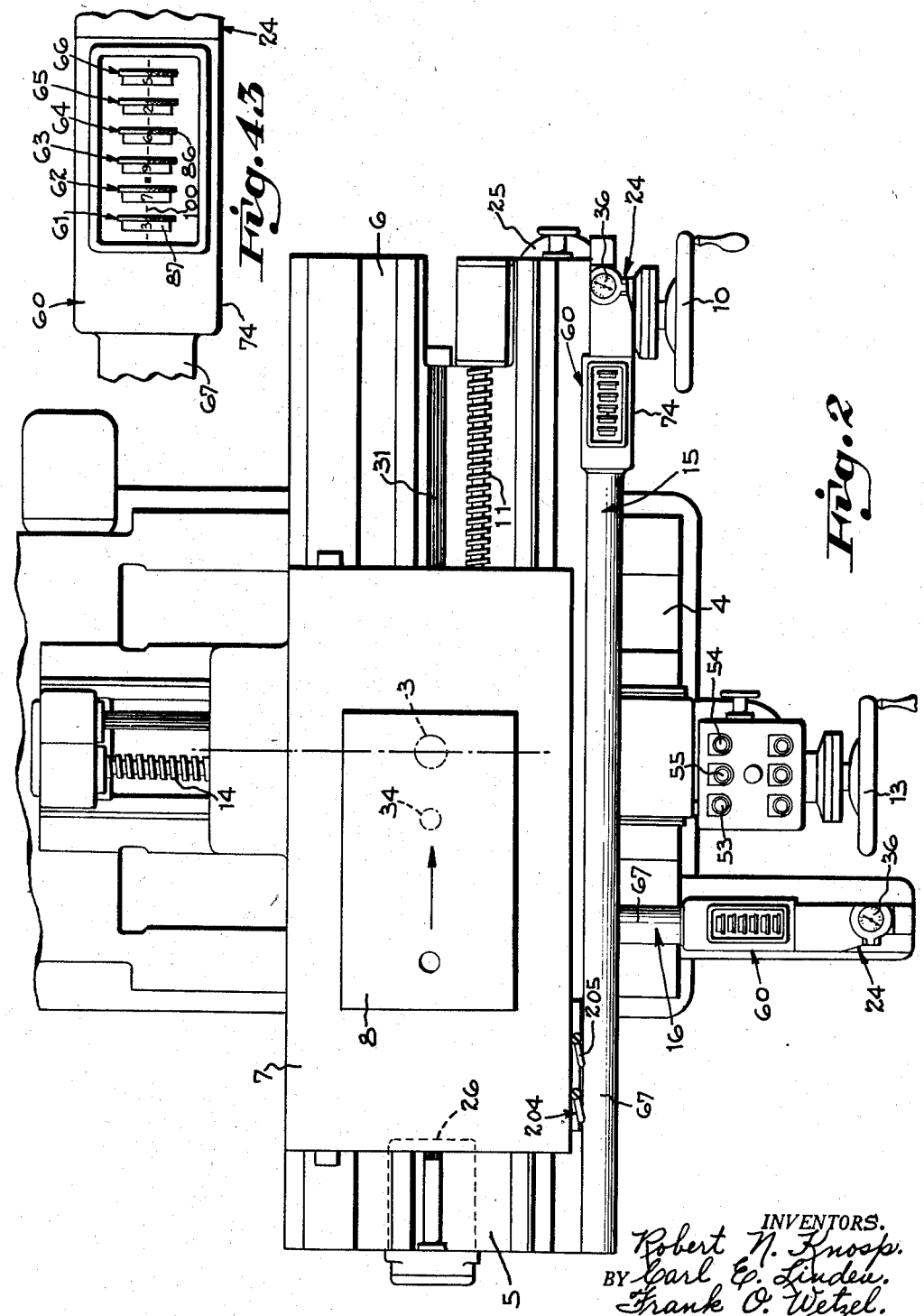

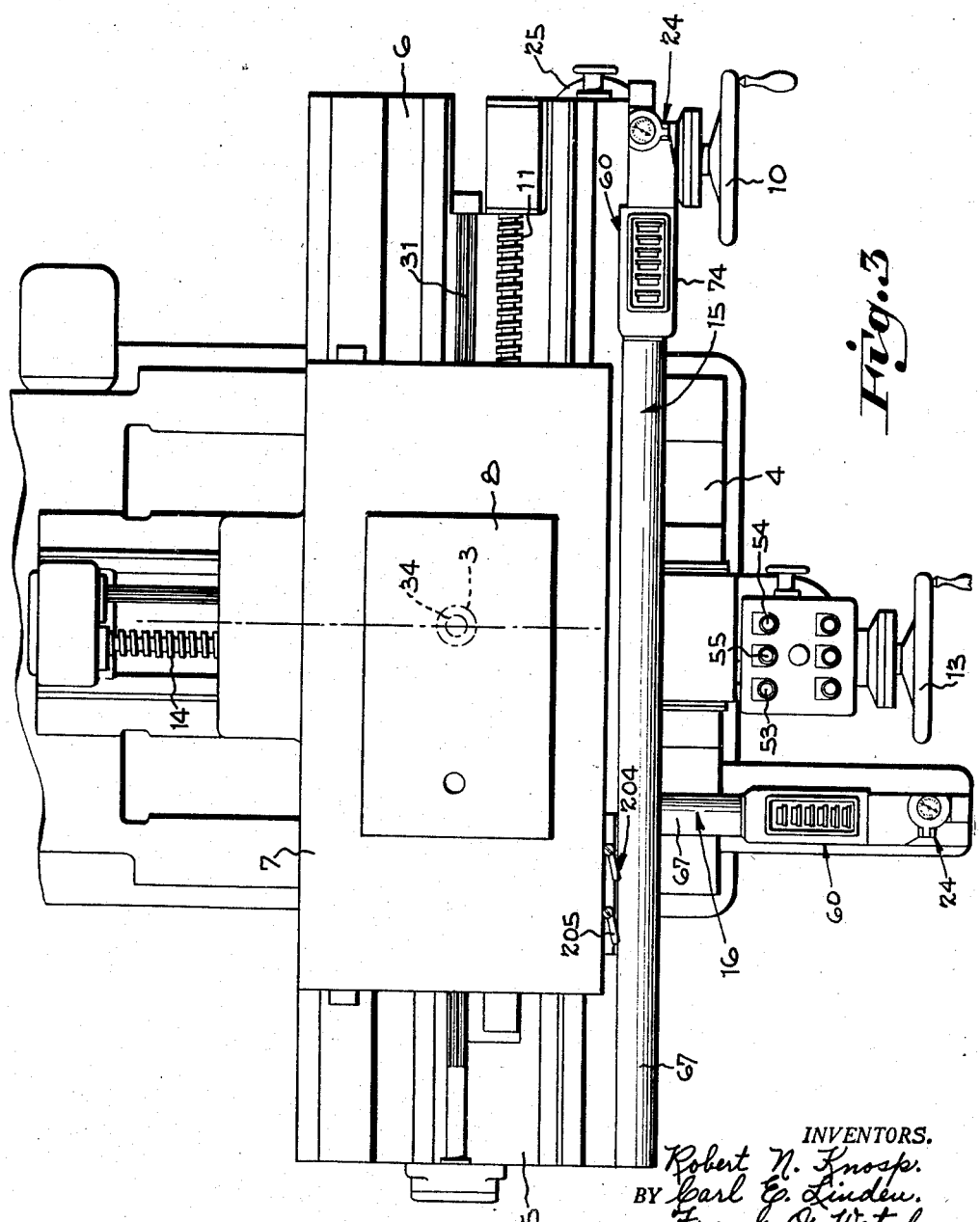

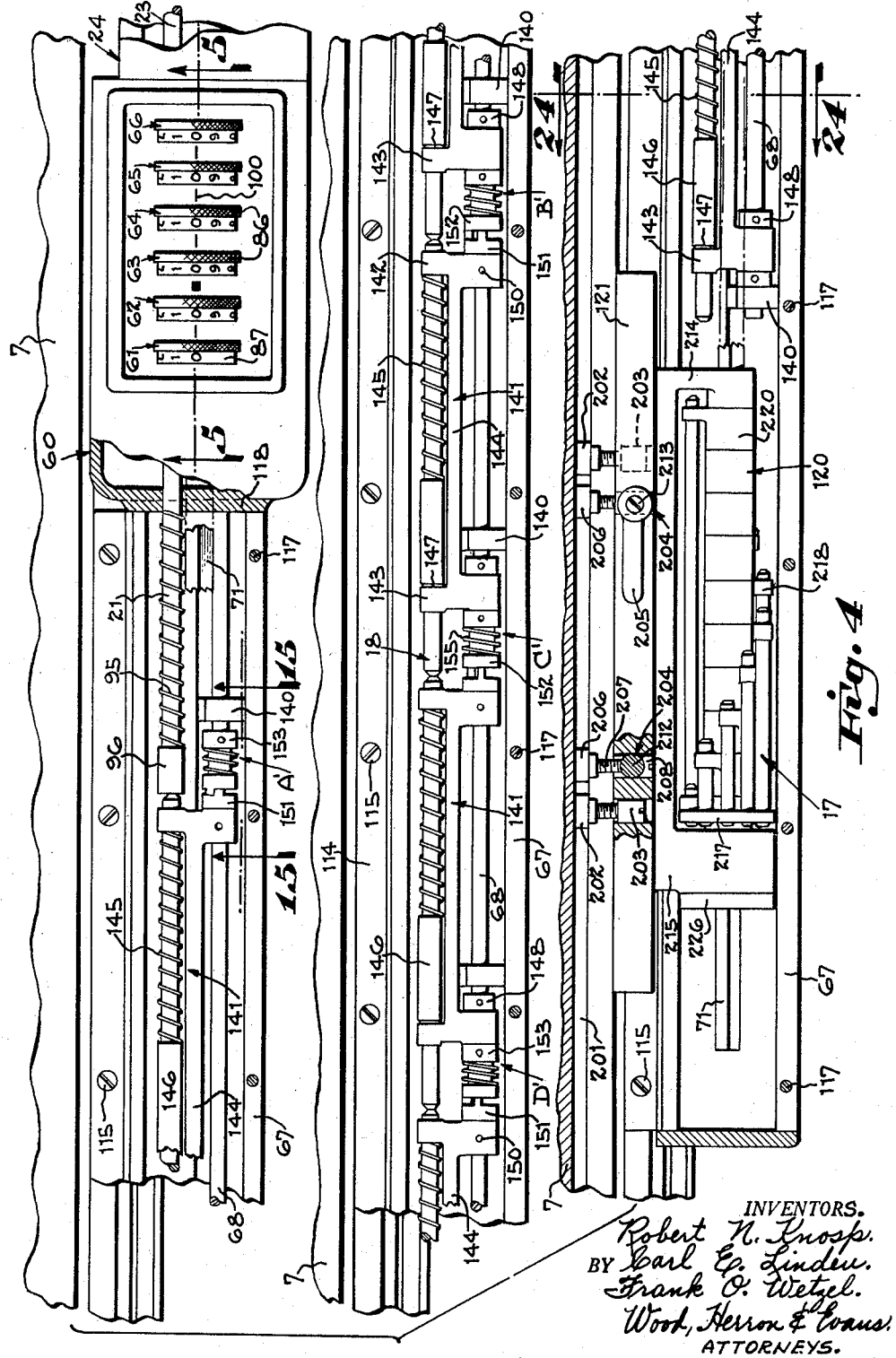

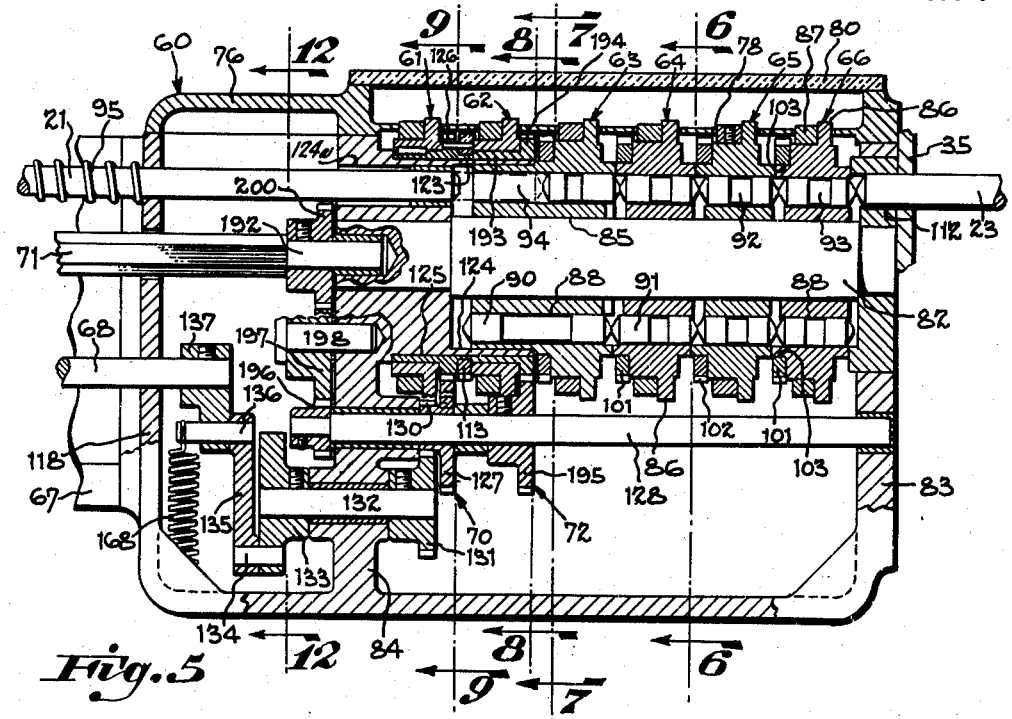
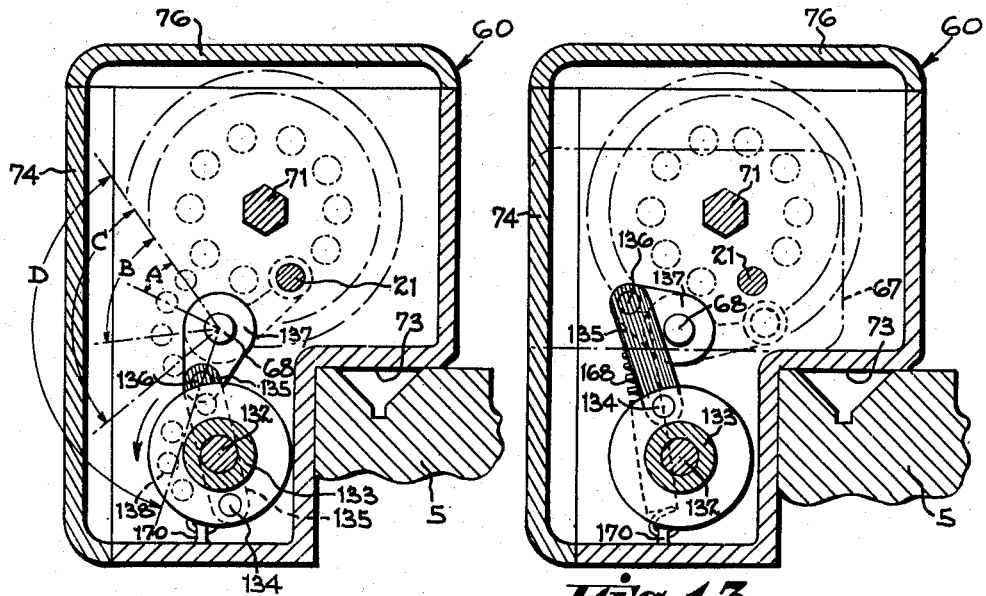

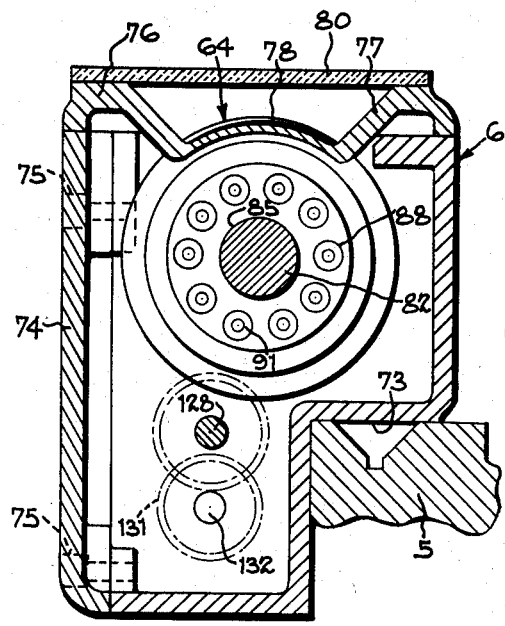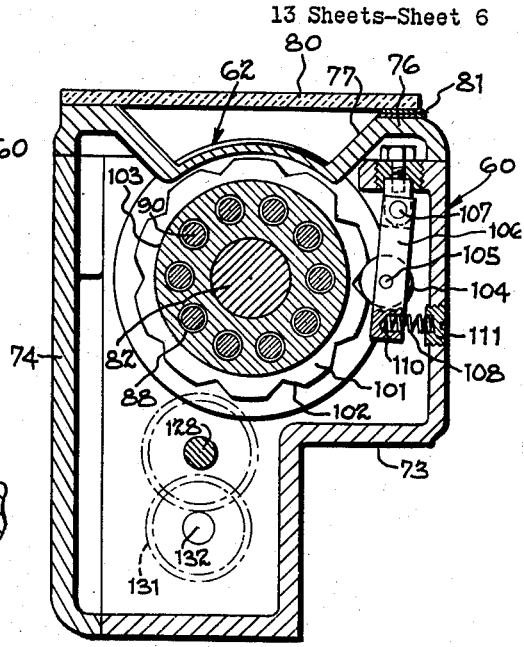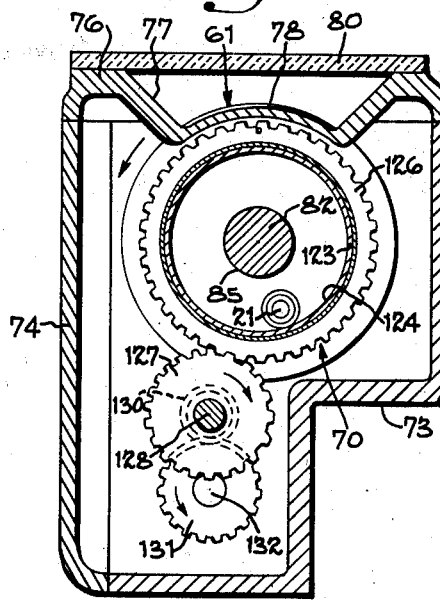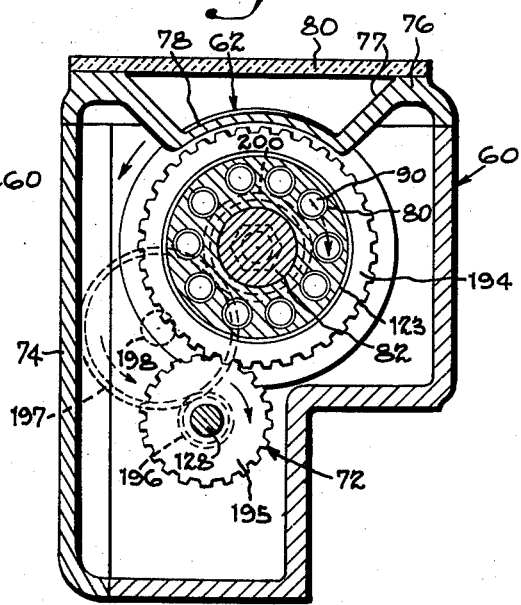

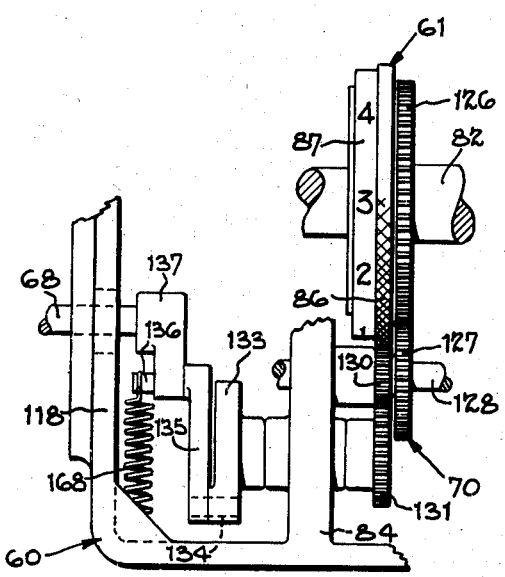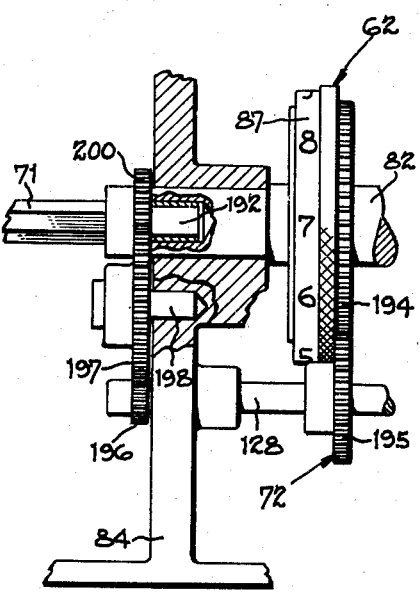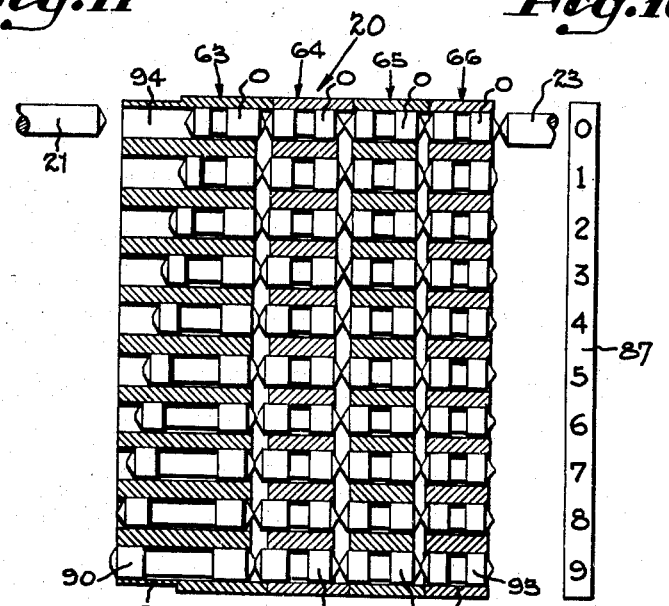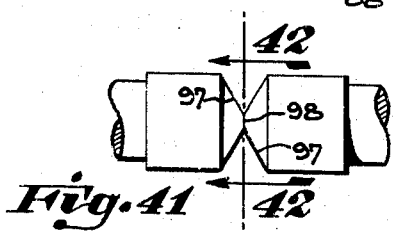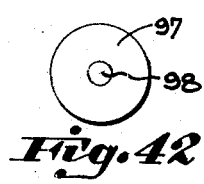

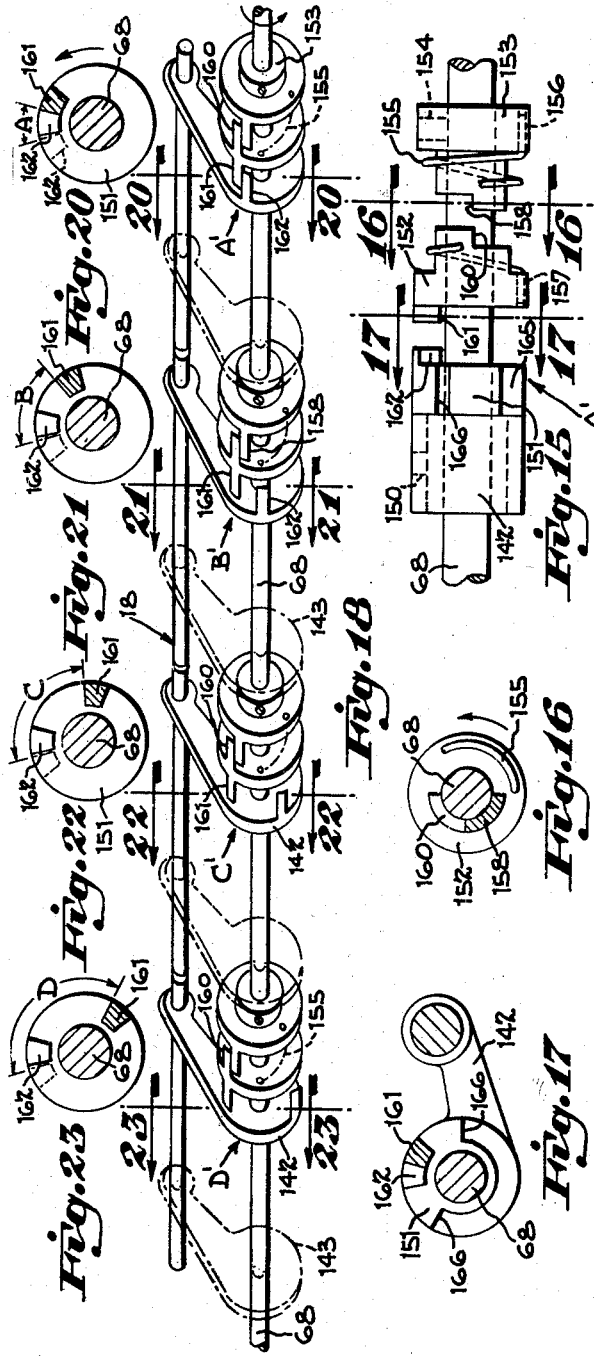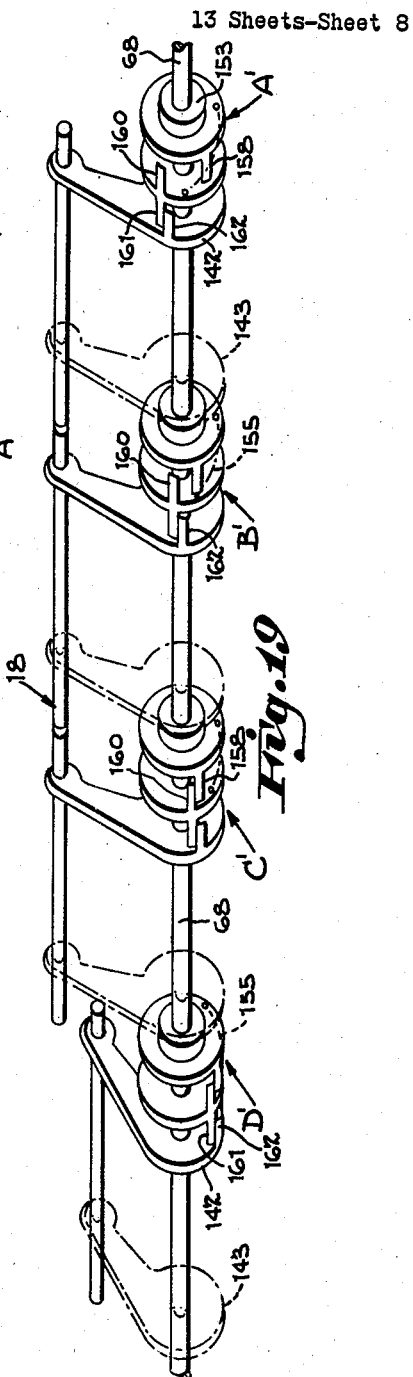

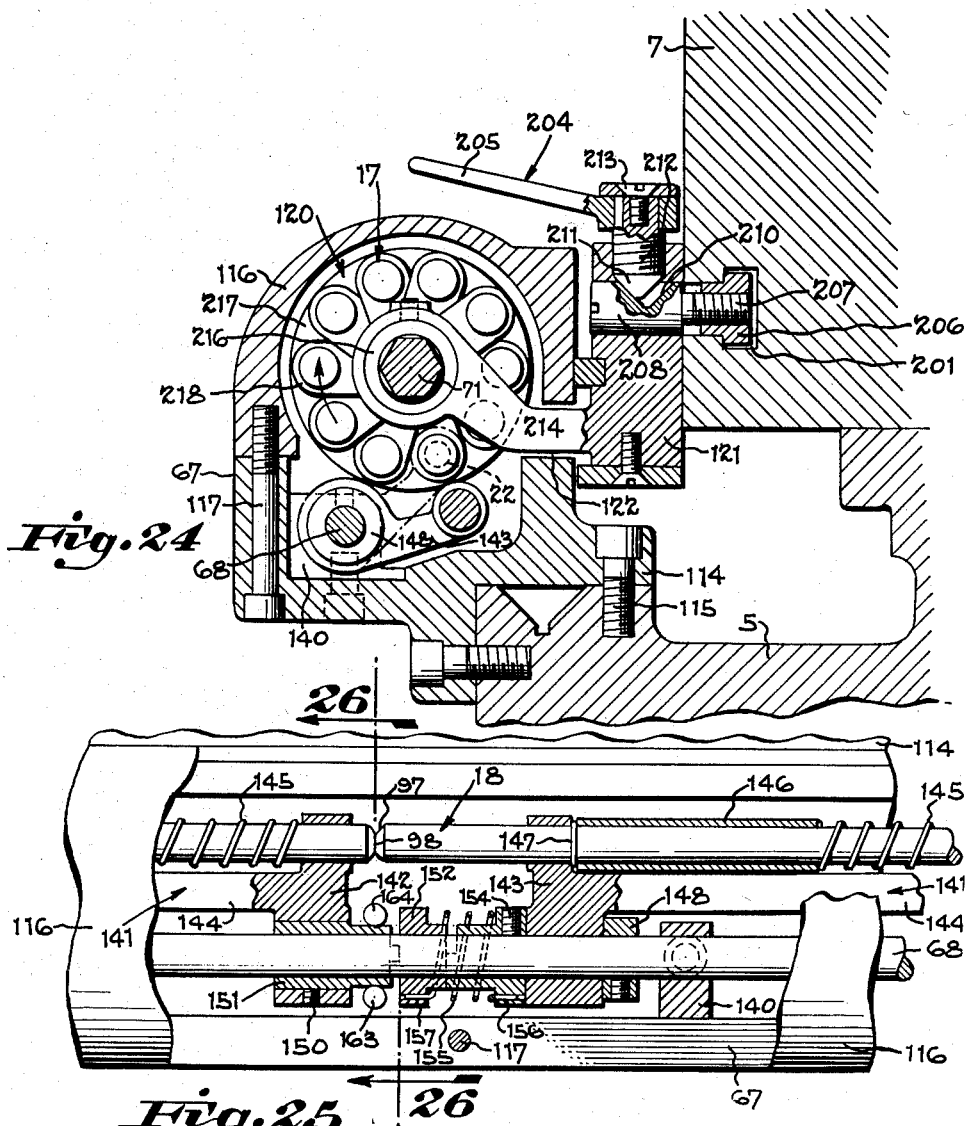
Fig. 24
Fig. 25
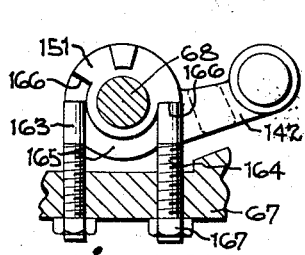
Fig. 26
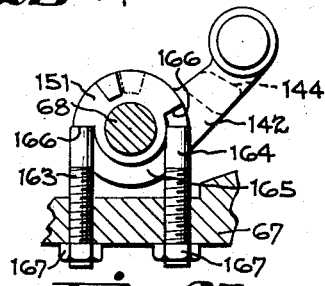
Fig. 27

Oct. 20, 1959 R. N. KNOSP ET AL 2,908,978
DIAL OPERATED MEASURING APPARATUS FOR MACHINE TOOLS
Filed Feb. 3, 1955 13 Sheets-Sheet 10
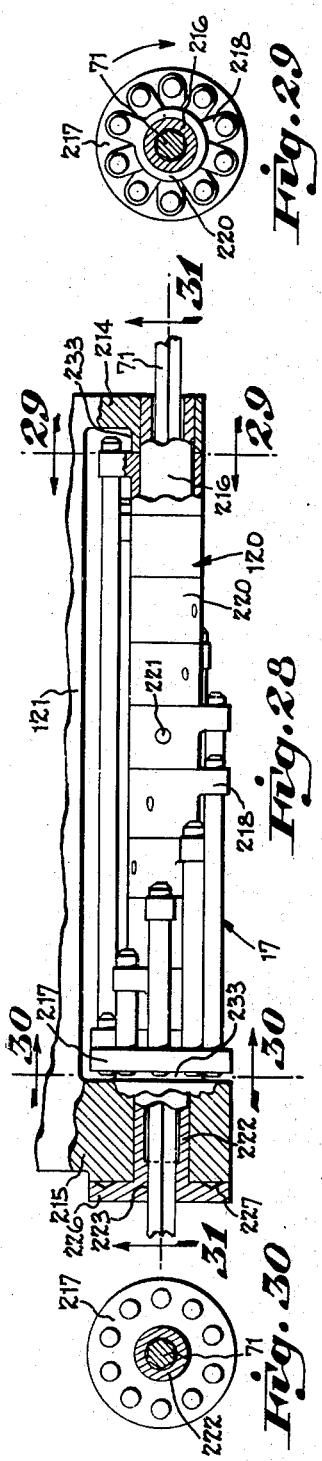
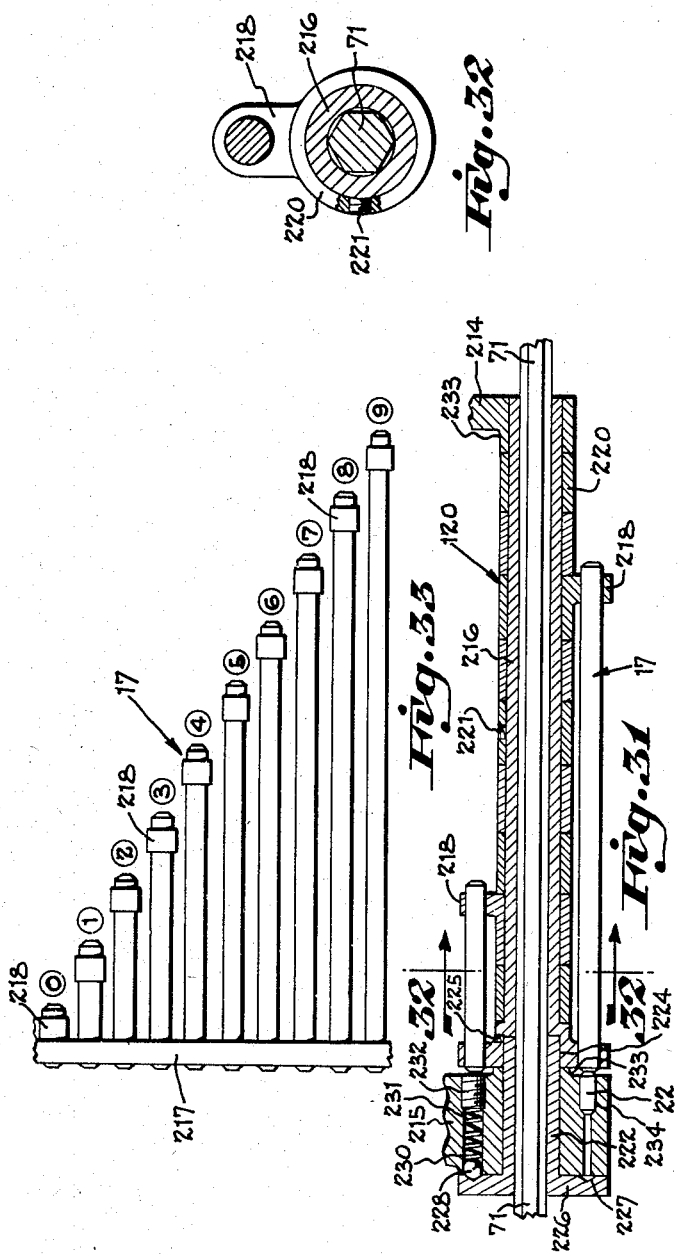
INVENTORS.
Robert N. Knosp.
BY Carl E. Linden.
Frank O. Wetzel.
Wood, Herron & Evans.
ATTORNEYS.

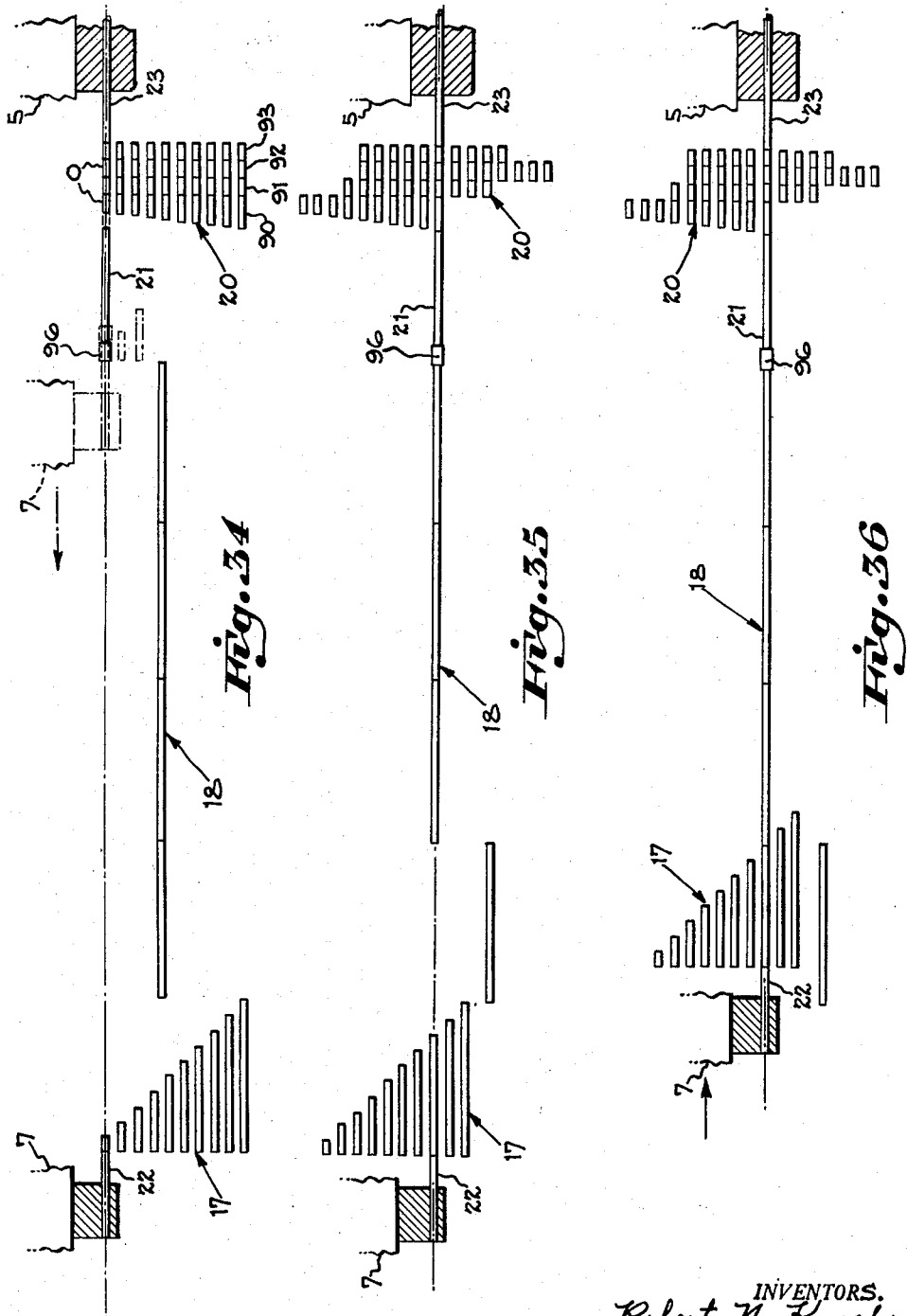

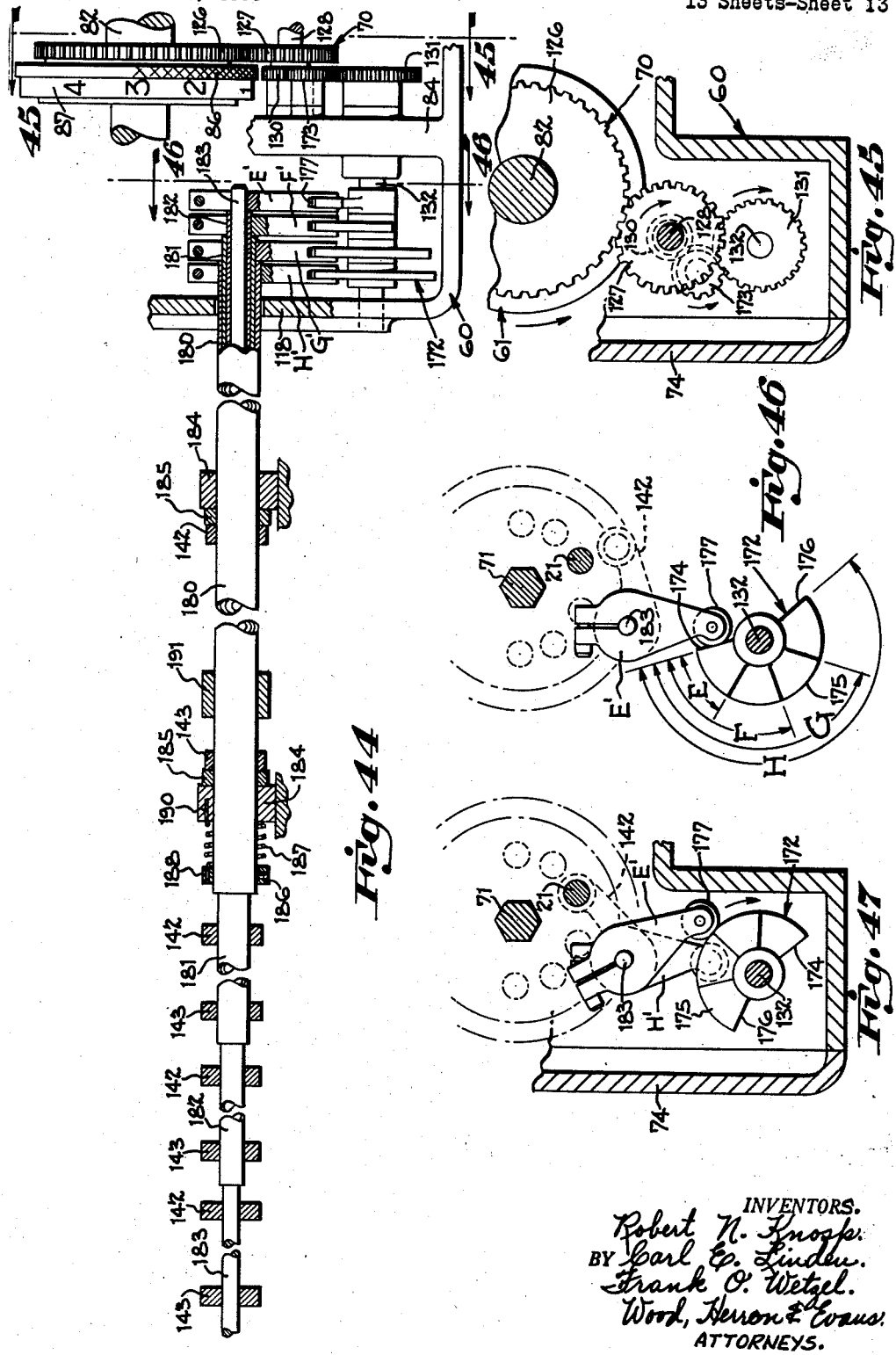

United States Patent Office
2,908,978
Patented Oct. 20, 1959

2,908,978

DIAL OPERATED MEASURING APPARATUS FOR MACHINE TOOLS

Robert N. Knosp, Ludlow, Ky., and Carl E. Linden, Cincinnati, and Frank O. Wetzel, Norwood, Ohio, assignors, by mesne assignments, to The Fosdick Machine Tool Company, Cincinnati, Ohio, a corporation of Ohio Application February 3, 1955, Serial No. 485,851

20 Claims. (Cl. 33—125)

This invention relates to a measuring apparatus for locating the lineally movable part of a machine tool in a precise position relative to a stationary part, utilizing selective lineal measuring rods to govern the position of the movable part.

A primary object of the invention has been to provide a measuring apparatus for the rapid and precise selection of measurements, utilizing a series of direct reading dials which, upon rotation to a given dimension, selects a series of measuring rods of graduated length corresponding lineally to the dimension indicated by the dials. The selected measuring rods are shifted by the dials into axial alignment with one another, their additive lengths acting in abutment between the stationary and movable part to locate the movable part.

The use of measuring rods in machining operations is well known. However, conventional measuring rods are entirely separate from the machine tool and must be selected and placed in it by hand. For example in setting up the machine, the operator selects one or several rods to obtain the required dimension and places the rods in axial alignment between abutments on the movable and stationary parts. In addition to the measuring rods, it is often necessary to place an adjustable micrometer between the rods to carry the measurement to a decimal place which cannot be obtained directly by the rods. Since these steps must be executed for each positioning operation, involving considerable time and effort, the conventional measuring rods are used only for work requiring exceptional precision.

According to the present invention, the apparatus provides dial operated measuring rods of graduated length in multiples of inches and decimals of an inch to the fourth decimal place. These several orders of rods are stored in an inactive position and are shifted to active or measuring position by rotation of the dials, one dial being provided for each order of length increments. Accordingly, any series of dimensions may be selected rapidly and in a positive manner. The measuring rods consist of length gauges within the close limits of standard gauge practice, such that the selected dimensions are accurate within extremely close limits.

In order to illustrate the principles of the invention, the measuring apparatus is disclosed in relation to a jig boring machine which is utilized in the precise centering and machining of holes in jigs and other precision work. In general, the jig boring machine comprises a bed having a vertical column which carries the rotating tool spindle. The spindle is shiftable along a vertical axis relative to the bed. Upon the bed there is mounted a cross slide movable transversely below the spindle, a table being mounted upon the slide for longitudinal movement relative to the spindle. The work, which is clamped to the table, is located relative to the spindle by the coordinated transverse and longitudinal movements of the slide and table. The conventional measuring rods are placed in troughs, one trough on the bed for positioning the slide transversely and second trough on the slide for positioning the table longitudinally.

In its application to a jig boring machine, one measuring apparatus is mounted relative to the table for governing the table position and a second measuring apparatus is mounted relative to the cross slide for governing the slide position. In locating a hole center, the two sets of dials are rotated to the desired setting, thus providing transverse and longitudinal coordinates for locating the hole center. In order to take advantage of the high order of precision created by the apparatus, the machine preferably is installed in an air conditioned area having a constant temperature to prevent contraction or expansion of the parts. The apparatus for the table and slide is identical, therefore, the disclosure is restricted to the table positioning apparatus.

According to the present disclosure, the measuring apparatus utilizes one set of rods graduated in lineal multiples of ten inches, a second set graduated in increments of one inch and a third set graduated in decimal increments. The decimal rods are arranged in four individual sets in the order of tenths, hundredths, thousandths, and ten-thousandths of an inch. A ten-inch dial is arranged to select the ten-inch rods, a one-inch dial for the one-inch rods and an individual decimal dial for each set of decimal rods. The dials are located in a dial housing adjacent one another on a common axis of rotation to provide direct reading of the selected dimension. The one-inch and decimal dials each bear ten calibrations from zero to nine, corresponding to the effective lengths of their associated rods from zero in units and decimals. The one-inch and decimal dials thus provide any dimension from 0.0000" to 9.9999" simply by turning the individual dials in either direction to the required setting. The ten-inch dial is calibrated to provide five positions from zero to four, corresponding to the effective lengths of four ten-inch rods, thus adding multiples of ten inches to the selected dimension of units and decimals.

The respective sets of decimal rods are slidably mounted in turret fashion around the barrels of the dials in a circle concentric to the axis of rotation for selective endwise alignment. The one-inch rods are slidably mounted in a rotatable turret coaxial to the decimal dials for selective alignment with the decimal rods. The decimal dials are mounted upon the slide and the one-inch turret is mounted upon the movable table and spaced longitudinally from one another. The dials and turret are mounted between longitudinally spaced, aligned measuring rod abutments carried by the table and slide, the selected rods being in axial alignment with the abutments for endwise engagement with the abutments upon positioning movement of the table.

A significant feature of the invention resides in the arrangement of the ten-inch measuring rods with respect to the dials and turret. To avoid the use of extremely long rods, individual ten-inch rods are placed in endwise alignment to provide the measurement in additive fashion. When stored in inactive position, the ten-inch rods reside in alignment along an axis parallel to but spaced transversely from the axis of the spaced measuring rod abutments. The rods are mounted relative to the slide and are shiftable sequentially into alignment with the axis of the abutments endwisely between the selected decimal and one-inch rods. The one-inch turret passes over the inactive stored rods and engages the end of the selected ten-inch rod or rods upon movement to final position. The selected decimal, one-inch and ten-inch rods are thus engaged between the abutments at final position to provide the measurement according to their additive lengths. If no ten-inch rod is selected, the turret passes over them and its selected rod contacts the selected decimal rods.

For selecting the one-inch and ten-inch rods, which are remote from the dials, respective gear trains are connected to the one-inch and ten-inch dials and include selector shafts extending from the dial housing to the rods. The ten-inch rods are pivotally mounted for transverse rocking motion within an elongated housing extending from the dial housing, the one-inch turret being movable longitudinally within the housing. The ten-inch rods are rocked transversely in sequence from their inactive position in response to the stepwise rotation of the ten-inch selector shaft as the ten-inch dial is advanced from one graduation to the next.

In its preferred embodiment, the measuring apparatus is utilized in conjunction with the automatic positioning apparatus disclosed in Patent No. 2,674,706 to R. N. Knosp et al. The positioning apparatus of the patent includes a control unit having a spring loaded feeler rod or actuating plunger which governs the automatic positioning motors. The feeler rod corresponds to the abutment carried by the slide as noted above. In the prior patent, the feeler rod is actuated by measuring rods which are manually selected and placed between the end of the feeler rod and an abutment on the table. The control unit and positioning apparatus controls the movement of the table to stop the table at final position in response to pressure imposed by the measuring rods upon the feeler rod. In the present disclosure, the control unit is mounted relative to the dial housing such that the selected measuring rods are aligned with the feeler rod in the same manner to control the positioning movement of the table. The dial operated measuring apparatus thus cooperates with the automatic positioning mechanism to provide rapid selection of measurements and automatic positioning of the table, the combination therefore produces work at a rapid production rate within the exceptionally close limits of jig boring practice.

Although the measuring apparatus as disclosed utilizes inches and decimals of an inch, it is contemplated to apply the apparatus to the metric system of measurement in the same manner. The various features and advantages of the invention will be more fully apparent to those skilled in the art from the following detailed description, taken in conjunction with the drawings.

In the drawings:

Figure 2 is a fragmentary top plan view of the machine, illustrating the relationship of the measuring apparatus to the slide and table. In this view the table is shown shifted toward the left to allow the measuring apparatus to be adjusted.

Figure 3 is a view similar to Figure 2, showing the table shifted to the right in final position with the work piece located relative to the spindle by operation of the measuring apparatus.

Figure 4 is an enlarged fragmentary top plan view of the measuring apparatus taken from Figure 2, with the cover removed to illustrate the general relationship of the parts. Because of the lineal extent of the apparatus, it is shown broken into longitudinal sections placed one below the other and representing the entire length when placed end to end.

Figure 5 is a sectional view taken on line 5—5, Figure 4, detailing the selector dial assembly for shifting the several systems of measuring rods to measuring position.

Figure 6 is a sectional view taken on line 6—6, Figure 5, detailing one of the selector dials.

Figure 7 is a sectional view taken on line 7—7, Figure 5, detailing the detent mechanism of one of the dials.

Figure 8 is a sectional view taken on line 8—8, Figure 5, illustrating the gear train from the dial which selects measuring rods in one-inch increments.

Figure 9 is a sectional view taken on line 9—9, Figure 5, illustrating the gear train from the dial which selects measuring rods in ten-inch increments.

Figure 10 is a diagrammatic view taken from Figure 5, further illustrating the gear train shown in Figure 8.

Figure 11 is a diagrammatic view similar to Figure 10, further illustrating the gear train of Figure 9.

Figure 12 is a sectional view taken on line 12—12, Figure 5, illustrating the mechanism which is driven by the gear train of Figure 9 in selecting the ten-inch measuring rods. In this view, the parts are shown in position for elevating the rods to active position corresponding to Figure 5.

Figure 13 is a view similar to Figure 12, showing the position of the parts when the rods are shifted to inactive or lowered position.

Figure 14 is a developed view of the dials of Figure 5, showing the several systems of decimal measuring rods.

Figure 15 is an exploded view taken along line 15—15, Figure 4, illustrating one of the selective clutches for shifting the ten-inch measuring rods to active position.

Figure 16 is a sectional view taken on line 16—16, Figure 15, illustrating yieldable driving connection of the clutch.

Figure 17 is a sectional view taken on line 17—17, Figure 15, detailing the selective dog arrangement of the clutch.

Figure 18 is a diagrammatic view illustrating the principle of operation of the selective clutches, the measuring rods being shown in their lowered or inactive position.

Figure 19 is a diagrammatic view similar to Figure 18, showing the relationship of the parts upon operation of the clutches to elevate three of the ten-inch measuring rods.

Figure 20 is a sectional view corresponding to line 20—20, Figure 18, showing the selective dog arrangement of the first clutch of the series.

Figures 21, 22 and 23 are sectional views similar to Figure 20, as indicated on Figure 18, illustrating the dog arrangement of the remaining clutches of the series.

Figure 24 is a fragmentary sectional view taken on line 24—24, Figure 4, illustrating the relationship of the ten-inch and one-inch measuring rods.

Figure 25 is a fragmentary view taken from Figure 4, further detailing the mounting and actuating arrangement for the ten-inch measuring rods.

Figure 26 is a sectional view taken on line 26—26, Figure 25, showing the stop for limiting the downward or inactive position of the measuring rods.

Figure 27 is a sectional view similar to Figure 26, showing the measuring rod in its elevated or active position relative to the stop.

Figure 28 is a fragmentary view taken from Figure 4, showing the one-inch measuring rod turret.

Figure 29 is a sectional view taken on line 29—29, Figure 28, further illustrating the arrangement of the one-inch measuring rods.

Figure 30 is a sectional view taken on line 30—30, Figure 28 further illustrating the turret structure.

Figure 31 is a sectional view taken on line 31—31, Figure 28, detailing the internal structure of the turret.

Figure 32 is an enlarged sectional view taken on line 32—32, Figure 31, detailing one of the rod mounting brackets of Figure 31.

Figure 33 is a developed view of the turret.

Figure 34 is a diagrammatic view of the measuring rod system at zero setting, the table being retracted to permit the measuring rods to be adjusted to a desired dimension.

Figure 35 is a view similar to Figure 34, showing the selected measuring rods shifted to active position.

Figure 36 is a view similar to Figure 35, showing the table shifted to final position with the selected measuring rods in endwise abutment.

Figure 41 is an enlarged fragmentary view illustrating the tapered ends of the measuring rods.

Figure 42 is a sectional view taken on line 42—42, Figure 1, illustrating the anvil contact surface at the ends of the measuring rods.

Figure 43 is an enlarged fragmentary top plan view of the dial housing.

Figure 44 is a fragmentary sectional view illustrating a modified driving system utilizing cams for selectively shifting the ten-inch rods.

Figure 45 is a sectional view taken on line 45—45, Figure 44, showing the gear train connecting the selector cams to the ten-inch selector dial.

Figure 46 is a sectional view taken on line 46—46, Figure 44, showing the selector cams and cam levers, the cams being shown in a position corresponding to the inactive or lowered position of the ten-inch rods.

Figure 47 is a view similar to Figure 46, showing the cams rotated to a position to shift three of the ten-inch rods to active or elevated measuring position.

General arrangement

Figure 1:
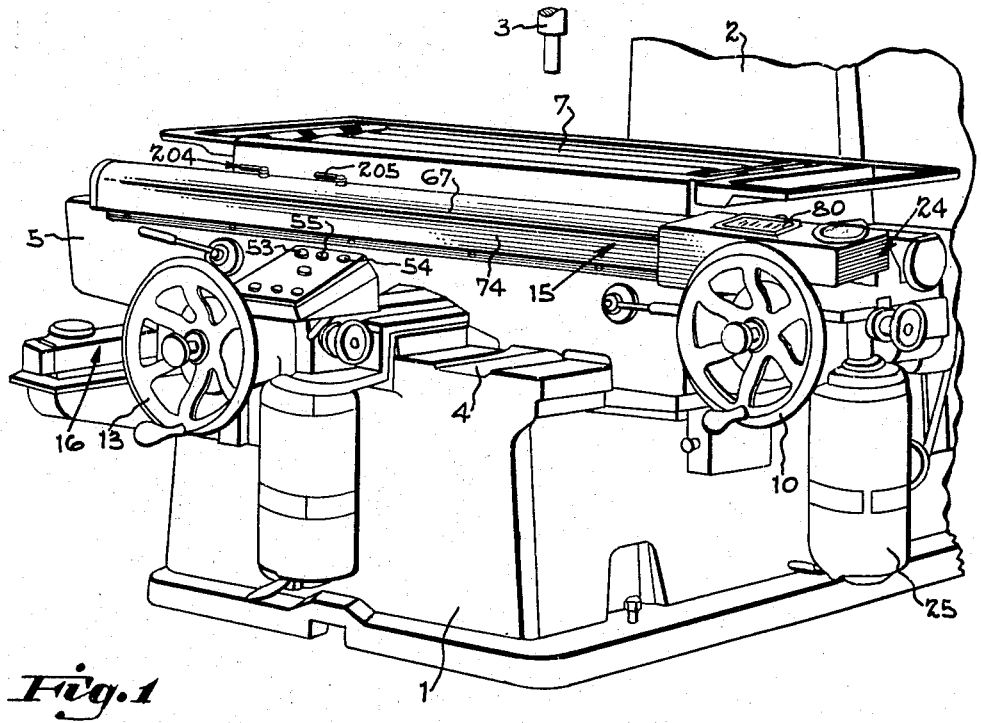
Figure 1 is a fragmentary perspective view of a jig boring machine equipped with the present measuring apparatus.

In order to illustrate the utility of the present measuring apparatus, it is illustrated in Figures 1 to 3 in its application to a jig boring machine having a positioning apparatus as disclosed in the aforesaid Knosp et al. Patent No. 2,674,706. It will be understood of course, that the apparatus is intended to be applied to machine tools in general which include a movable member such as a slide which must be located precisely with respect to a stationary element such as a spindle.

Since the structural details of the boring machine do not form an essential part of the invention, only those parts are shown which are necessary to an understanding of the measuring apparatus. Described generally with reference to Figures 1 to 3, the boring machine comprises a stationary bed 1 having a column 2 rising vertically from its rearward side. A drill head (not shown) is carried by the column and includes a spindle 3 which projects downwardly toward the bed. The top surface of the bed includes ways 4 slidably supporting a cross slide 5 for movement transversely across the bed. The upper surface of the cross slide includes longitudinal ways 6 upon which is slidably mounted the work table 7, the work piece 8 being clamped upon the table in the usual manner. It will be understood that the cross slide shifts the table transversely relative to the spindle and that the table is shiftable longitudinally upon the slide. Accordingly, the work piece 8, which is mounted upon the table is shifted longitudinally and transversely relative to the spindle 3 to locate the hole centers.

Figure 40:
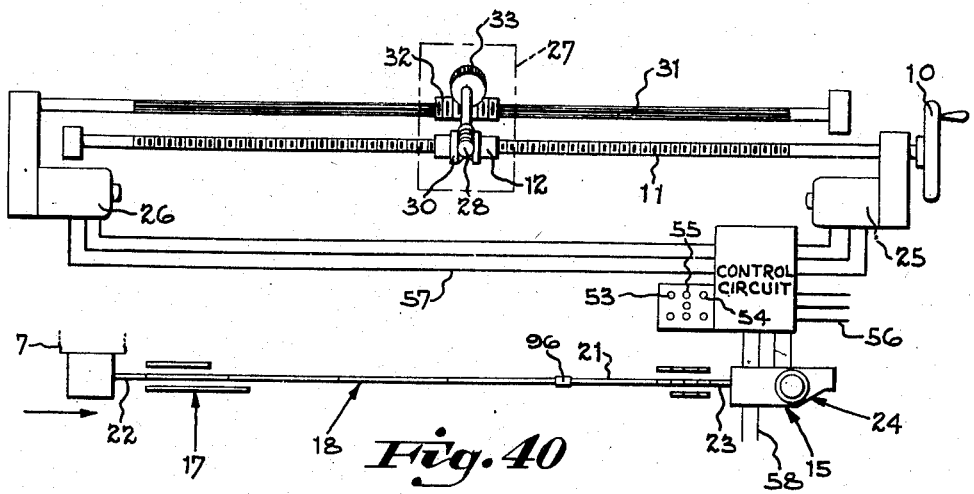
Figure 40 is a diagrammatic view illustrating the table positioning mechanism associated with the measuring apparatus.

In operating the machine manually, the table may be shifted longitudinally along the slide by means of a hand wheel 10 which is connected by a gear train (not shown) to a lead screw 11 in driving connection with a table by a nut 12 (Figure 40). A second hand wheel 13 is similarly connected to a lead screw 14 for shifting the slide transversely across the bed (Figure 2).

The longitudinal position of the table relative to the slide is governed by the measuring apparatus of the present invention which is indicated generally at 15. A similar measuring apparatus, which is indicated at 16, governs the transverse position of the slide upon the bed. Since the measuring apparatus for the table and slide is identical, the apparatus is disclosed in detail as applied to table positioning.

Described generally, the measuring apparatus consists of sets of measuring rods of incremental length, indicated diagrammatically at 17, 18 and 20 in Figures 34 to 36. According to the present disclosure, the rods 17 are arranged in length increments of 1" and are identified in the specification as "one-inch rods." The rods 18 are each 10" long and are designated as "ten-inch rods." The four sets of rods indicated collectively at 20 are arranged in decimal increments and are designated as "decimal rods." Each rod consists of a gage of precise length within the close tolerance limits of standard gage practice. The opposite ends of the rods form parallel contact anvils.

The four sets of decimal rods 20 provide respective measurements in the order of tenths, hundredths, thousandths and ten-thousandths of an inch to carry the dimension to the fourth decimal place. The one-inch rods are arranged in a series of ten, the shortest rod of the series representing zero and the longest rod providing a nine-inch measurement. Each set of decimal rods correspondingly consists of a series of ten rods, the shortest rod representing zero and the longest representing nine in the decimal order. The one-inch and decimal rods are mounted in rotatable carriers, as explained later, so arranged that selected one-inch and decimal measuring rods of each series of rods may be indexed into endwise alignment by rotating the carriers relative to one another. Accordingly, when the selected one-inch and decimal rods are placed axially in abutment, they provide in combination any measurement from 0.0000" to 9.9999". The several carriers for the decimal rods are mounted relative to the slide and the carrier for the one-inch rods is mounted for axial movement with the table relative to the decimal rods.

In order to conserve space, the ten-inch measuring rods are mounted relative to the cross slide in a position to be shifted transversely into measuring position between the relatively movable one-inch and decimal rods. The ten-inch rods are arranged in axial alignment with one another and provide measurements in multiples of ten inches. They normally reside in alignment with one another below the line of movement of the one-inch rod carrier to allow the carrier to pass with the table over the inactive rods. The active or selected ten-inch rods are engaged endwisely between the one-inch rods and a spring loaded thrust rod 21, which contacts the decimal rods as indicated in Figure 36.

The rods of each set are selected by direct reading dials, one dial for each order of length increments to provide direct selection of the required dimension. When in active or measuring position, the selected rods are disposed in endwise alignment with one another between abutment rods 22 and 23 mounted on the relatively movable table and slide. As indicated in Figures 34 to 36, the abutment rod 22 is carried by the table and engages the left end of the coaxial rods as the table moves toward the right during its positioning motion. The table is thus effective to shift the rods toward the right into contact with one another and against the rod 23 which is mounted relative to the cross slide. Rod 23 represents the spring loaded feeler rod of a control unit for governing automatic positioning; however, it also represents a positive stop when the apparatus is used for manual positioning.

The position of the abutment rod 22 indicated in broken lines in Figure 34, represents the preliminary operation of locating a base reference point on the work with reference to the axis of the drill spindle. During this operation, the measuring rods preferably are set at zero such that the lineal location of additional holes may be measured from the base reference point. In order to locate the succeeding hole or holes, the table is shifted toward the left, as shown in full lines in Figure 34, to clear the measuring rods and the dimension from the reference point to the new hole center is determined by rotating the dials to the required dimension. This places the selected measuring rods in active position as shown in Figure 35. After the setting is made, the table is shifted to the right until the measuring rods are in endwise engagement between rods 22 and 23 to locate the new hole center (Figure 36).

In principle, the measuring rods act as spacers between the table and slide to locate the table at final position. Therefore, when the measuring apparatus is applied to a conventional machine tool, such as a drilling machine, the rods 22 and 23 may consist of positive stops to locate the table upon its slide or saddle. The precise position is affected slightly by the amount of endwise pressure imposed upon the measuring rods but this variation is considerably less than the tolerance limits of ordinary machining operations.

However, in jig boring, the limits are extremely close and the endwise pressure imposed upon the measuring rods must be the same for each positioning operation to achieve the necessary precision. It will be understood that the measuring apparatus can be utilized in jig boring operations under manual control, utilizing the hand wheel 10 to shift the table. However, the apparatus is disclosed in conjunction with the automatic traverse and positioning mechanism of the prior patent since it is intended particularly for rapid production operations.

According to the present disclosure, the feeler rod 23 forms part of the control unit 24 of the automatic positioning apparatus of the prior patent, as indicated diagrammatically in Figure 40. As described later, the feeler rod is preloaded at a given pressure toward the measuring rods and is arranged to actuate a sensitive dial indicator mounted in the control unit. When the measuring rods are shifted endwisely at final position against the feeler rod, the dial indicator is deflected a predetermined amount and registers the final position accurately and consistently. The dial indicator is utilized to detect final position whether the table is shifted manually or by the automatic positioning apparatus.

*Automatic positioning*

For a general understanding of the principles of automatic positioning, the table positioning mechanism of the patent is disclosed diagrammatically in Figure 40. During its positioning movement, the table is moved at a rapid traverse rate by the rapid traverse motor indicated at 25 (Figures 2 and 40). As the table approaches final position, the traverse motor is deenergized and the table continues its advance at a slow positioning rate by operation of the positioning motor 26. As indicated in Figure 40, the traverse motor 25 is in driving connection with the lead screw 11, the table being advanced by the nut 12 threaded upon the lead screw. The nut is confined against endwise movement within a gear box 27 indicated by the broken lines, which is attached to the table. During the traverse motion, the lead screw rotates and the nut is locked against rotation by a worm 28, engaging the teeth of a worm wheel 30 which forms part of the nut.

During the positioning motion, the lead screw 11 remains stationary and the nut 12 is rotated relative to the lead screw by the positioning motor 26. For this purpose, the positioning motor is in driving connection with a spline shaft 31 upon which is slidably keyed a worm 32 confined against endwise movement relative to the gear box and meshing with the teeth of a worm wheel 33. Worm wheel 33 drives the worm 28 which meshes with the worm wheel 30 on the nut. This provides a reduction drive for rotating the nut at a slow rate relative to the stationary lead screw, thus inching the table along at a slow positioning rate.

During traverse and positioning motion toward a hole center, as indicated at 34 in Figure 2, the table is advanced toward the right as indicated by the arrows, causing actuation of the feeler rod 23 of control unit 24 at final position. The control unit is interconnected in a control circuit (Figure 40) which governs the operation of the traverse and positioning motors. The control circuit forms no part of the present invention; therefore, it is indicated in block form.

Figure 37:
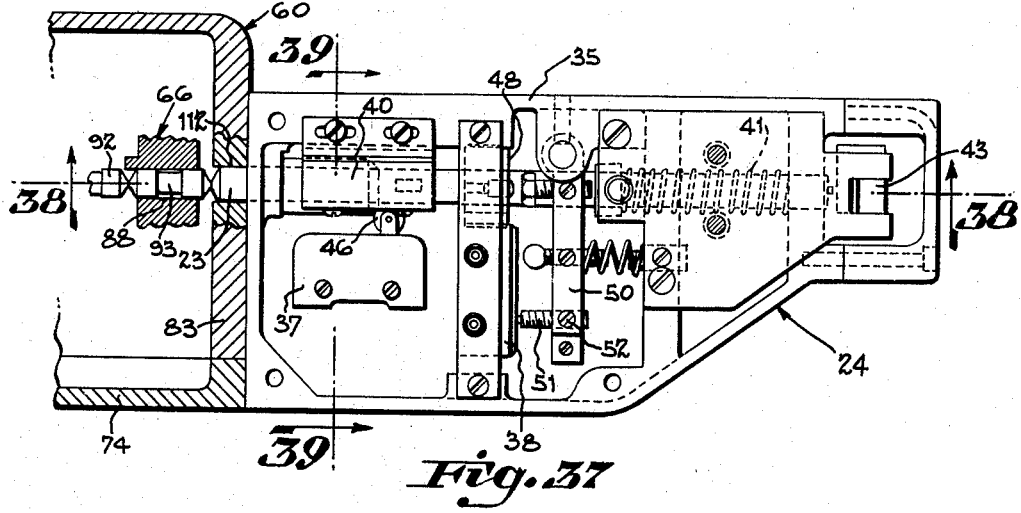
Figure 37 is a fragmentary view in top plan, showing the control unit of the automatic positioning apparatus associated with the end portion of the dial housing.
Figure 38:
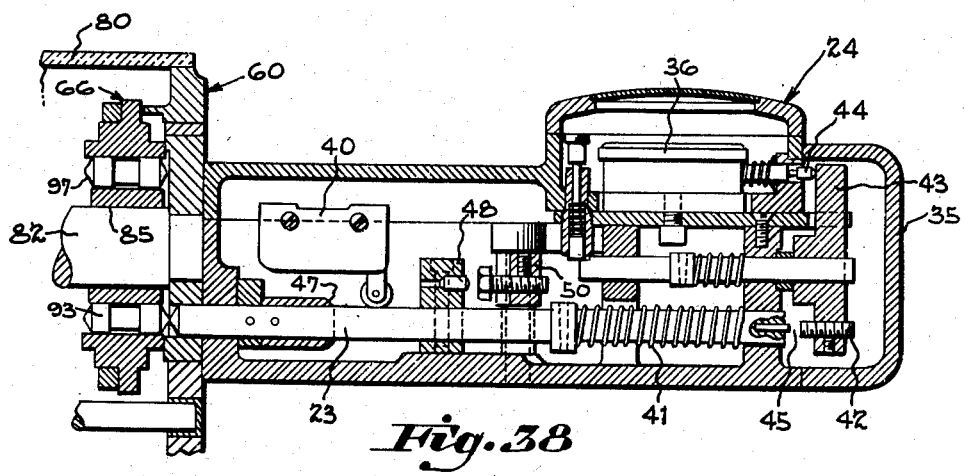
Figure 38 is a sectional view taken on line 38—38, Figure 37, further illustrating the control unit in relation to the dial system.
Figure 39:
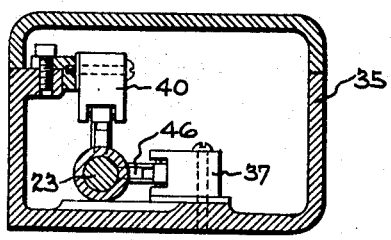
Figure 39 is a sectional view taken on line 39—39, Figure 37, further detailing the control unit.

The control unit 24 is illustrated in Figures 37 to 39 in order to bring out more clearly the operation of the measuring apparatus. In general, the control unit comprises a housing 35, mounting the dial indicator 36 and having a rapid traverse microswitch 37 and a final positioning micro-switch 38. In addition, the control unit includes a safety micro-switch 40 which prevents overtravel of the parts. The traverse and positioning switches 37 and 38 control the operation of the traverse and positioning motors 25 and 26 in response to the movement of the feeler rod 23. As shown, the feeler rod is slidably mounted within the housing and preloaded by the spring 41. The outer end of the rod is contacted by the last decimal rod of the series. The inner portion of the rod is interconnected with the several micro-switches and with the stem of the dial indicator 36 for actuating the switches and indicating upon the dial the true position of the table. The dial preferably is calibrated in ten-thousandths of an inch and its face is capable of being adjusted with respect to its pointer.

In setting up the machine, the face of the dial preferably is adjusted to a zero position relative to its pointer when the table and work are adjusted to a base reference position, with predetermined thrust imposed upon the feeler rod 23. This is represented by the position of the parts in broken lines in Figure 34, the spindle being accurately aligned with the first hole center or reference surface at this time. With the parts in this position, the feeler rod 23 is in contact with the stop screw 42 of an abutment finger 43 which contacts the stem 44 of the dial indicator.

It will be noted that when the table is shifted toward the left to permit the measuring rods to be set to the first dimension, the feeler rod will shift out of contact with finger 43, causing the dial indicator to deflect from the zero position. When the table is again shifted toward the right to its new position, the measuring rods will again shift the feeler rod toward the right, taking up the clearance 45 adjacent the stop screw 42, and finally shifting stem 44 to deflect the pointer of the dial indicator. Since the indicator was previously set at zero with the measuring rods at zero, it will be shifted back toward the zero position when the measuring rods actuate the feeler rod. Therefore, each new setting of the rods provides a precise measurement from the base reference position within the limits shown by the dial indicator.

The movement of the feeler rod in taking up the clearance 45 is utilized to actuate the traverse and positioning switches 37 and 38 in sequence through the operation of the control circuit. For this purpose the traverse switch 37 includes a roller 46 camming against the tapered end 47 of an actuating sleeve. As the measuring rods begin to shift the rod toward the right, roller 46 is cammed in a direction to trip switch 37. The control circuit is arranged to plug traverse motor 25 to a stop when the switch is tripped and concurrently to cut in the final positioning motor. As the feeler rod continues its movement, an abutment block 48 on the rod contacts a motion increasing lever 50 which is pivoted at its upper end as seen in Figure 37. Lever 50 multiplies the movement of the feeler rod and its swinging end moves out of contact with the plunger 51 of the final positioning switch in response to movement of the rod. When the rod has moved the lever to a predetermined position, the final positioning switch 38 is tripped. This conditions the control circuit to stop the positioning motor at final position.

It will be understood that the set screw 52 of lever 50 is adjusted to trip the positioning switch at the same time the feeler rod 23 shifts the pointer of the dial indicator back to its zero position to indicate the true table position. In actual practice, it has been found that the hole center is aligned with the spindle axis consistently within a tolerance of plus or minus .0001" upon each operation.

Since the control unit 24 is located at the right end of the slide, operation of the table under automatic control is to the right, that is, toward the measuring rods and feeler rod of the control unit. To allow selection of the measuring rods, the table is shifted toward the left by manual operation of a push button. The table may also be shifted toward the right under push button control. For this purpose there is provided a push button station having a left push button 53 and a right push button 54 (Figures 2 and 40) suitably interconnected with the control circuit to energize the traverse motor for the required direction of table movement. In addition, the station includes a positioning push button 55 which initiates the automatic cycle of operation.

As indicated, electrical energy is supplied to the control circuit by the power lines 56, the motors being energized from the control circuit by way of the power lines 57. The control circuit is energized by the low voltage lines indicated at 58. It will be understood that the control circuit includes the necessary relays and other components for providing forward and reverse rotation of the traverse motor in response to operation of the push buttons 53 and 54 and to govern the operation of the traverse and positioning motors during automatic positioning.

After the table has been shifted to the left by operation of push button 53, the measuring apparatus is set to the required dimension and thereafter, the positioning push button 55 is depressed to place the mechanism under automatic control. In its preferred embodiment, as disclosed in the patent, the table is traversed at the rate of 72 inches per minute toward the right until it displaces the measuring rods and feeler rod sufficiently to trip the rapid traverse switch 37. At this point the rapid traverse motor is plugged to a stop and the positioning motor is energized to continue the advancement of the table in the same direction at the rate of .415 inch per minute to bring the table to final position.

Measuring rod selector

The several sets of measuring rods for a given dimension are selected by direct rotation of the dials of the dial housing indicated generally at 60 (Figures 1–3 and 5). Each dial is graduated to indicate its order of length increments, such that the dials collectively provide a direct reading of the selected dimension. As noted earlier, the dials are arranged to select measuring rods in increments of ten inches and one inch and to select decimal measuring rods in increments of tenths, hundredths, thousandths and ten-thousandths of an inch. Referring to Figures 4 and 5, the ten-inch measuring rods are selected by the dial indicated generally at 61 and the one-inch rods are selected by the dial 62. The four sets of decimal rods are selected by the dials indicated at 63, 64, 65 and 66, one dial for each decimal place.

Referring to Figure 43, the dials are shown rotated to the dimensions 37.9625", the selected rods being indicated in Figure 36. Accordingly, three of the ten-inch measuring rods and one seven-inch rod have been shifted to a measuring position in alignment with rods 22 and 23 to provide the 37" dimension. For the decimal measurement, selected decimal measuring rods 20 providing the .9625" dimension have been shifted to measuring position.

As best shown in Figures 5 and 6, the decimal measuring rods are located directly in the four dials 63 to 66, while the ten-inch and one-inch measuring rods are remote from their dials within the elongated housing 67 (Figures 2 and 4) which projects from the dial housing 60. Dial 61 for the ten-inch rods 18 is connected to a selector shaft 68 by a gear train 70 (Figures 9 and 11). Dial 62 for the one-inch rods 17 is connected to a hexagonal selector shaft 71 by the gear train 72 (Figures 8 and 10).

Referring to Figures 5 and 6, the dial housing 60 consists of a box-like casting completely enclosing the components to protect them from dust and dirt. The housing includes an inset portion 73 at one side, interfitting the corner portion of the cross slide 5, and attached to the slide by screws, not shown. The forward side of the housing includes a cover plate 74 attached to it by screws 75. The upper portion 76 of the housing includes a centrally depressed, curved top wall 77. The curved wall is provided with slots 78, one for each dial, the upper periphery of each dial being exposed by the slots. A transparent cover plate 80 is hingedly connected to the upper portion 76 by a hinge 81 (Figure 7), such that the periphery of each dial may be contacted by the fingers for rotating the dial upon raising the cover plate. As indicated in Figure 4, the periphery of each dial is knurled for frictional engagement by the fingers. The six dials are rotatably mounted in common upon a dial shaft 82 having opposite ends mounted in the end wall 83 and intermediate wall 84 of the dial housing.

Each decimal dial is in the form of a barrel having a central bore 85 rotatably journalled on the dial shaft 82 and having a peripheral rim 86 which is knurled as indicated earlier. Adjacent each peripheral rim, the dial is counterturned to provide a seat for the indicator ring 87 which bears the dimension numerals (Figure 4). The indicator rings are locked against rotation upon the dials.

Each of the four decimal dials is provided with a set of measuring rod bores 88 equally spaced from one another and concentric to the dial shaft, each bore slidably confining one of the decimal measuring rods. The bores of the four decimal dials are located upon a common circle, such that upon adjusting the dials relative to one another, selected decimal rods of each set are indexed in alignment with one another, as indicated in Figures 6 and 14.

The first decimal dial 63 to the left (Figures 5 and 14) carries ten decimal rods 90, graduated in increments of one-tenth of an inch. The shortest rod of the set, indicated at 0, corresponds to the zero setting of the dial. In the present disclosure the zero rod has a length of 1.0000" and the rods increase by tenths to 1.9000". Similarly, the three dials residing to the right each carry a set of ten decimal rods respectively in increments of hundredths (rods 91), thousandths (rods 92) and ten-thousandths (rods 93). In each case, the shortest rod 0 of the set has a length of 1.0000" corresponding to zero. With the dials all set at zero position as indicated in Figures 5 and 14, the zero rods of the four decimal dials are aligned with one another, providing the clearance indicated at 94 between the end of the thrust rod 21 and the zero measuring rod. It will be noted that the zero rod of the set 93 is in contact with the feeler rod 23 of the control unit.

When the base reference point of the work is aligned with the spindle (Figure 34), the measuring apparatus is adjusted to bring the thrust rod 21 into contact with the zero measuring rod as indicated in broken lines in Figure 5. When the table is shifted toward the left to clear the measuring rods, the thrust rod 21 is advanced to the position shown in full lines by the compression spring 95. Spring 95 has one end seated against the collar 96 (Figure 4) secured to the rod and has its opposite end seated against the dial housing.

As indicated in Figures 5 and 14, the thrust rod 21 and feeler rod 23 are disposed in axial alignment and the selected decimal rods reside between them in axial alignment. The spacing between the thrust rod and feeler rod is slightly greater than the length of the decimal rods in their maximum setting. Since each dial provides increments respectively in tenths, hundredths thousandths and ten-thousandths of an inch, it will be apparent that any required dimension from .0000" to .9999" can be selected in steps of ten-thousandths of an inch by adjusting the dials individually.

The opposite ends of each measuring rod are tapered as at 97, the contact ends of the feeler rod and thrust rod being similarly tapered. During relative rotation of the dials, the tapered surfaces of adjoining rods are cammed one against the other to shift the rods endwisely without interference.

As indicated in Figure 41, the tapered ends of the rods each include a flat anvil surface 98 having a substantial area. This surface is free from wear since the tapered surfaces 97 tend to cam the rods away from one another as the dials are rotated, the anvil surfaces being subjected only to direct thrust forces.

When the dials are shifted to provide the maximum decimal measurement (.9999"), the rods occupy substantially the entire space between the ends of rods 21 and 23 except for the necessary running clearance between the ends of the adjoining rods. When a smaller dimension is selected, a greater amount of clearance will exist. This clearance is taken up as the table is shifted toward the right, forcing the aligned measuring rods into contact with one another between the thrust rod and feeler rod; consequently, the rods indicate the true dimension to which the dials are set.

It will be understood that when the apparatus initially is set up with the dials at zero and the spindle aligned with the base reference surface, the spring loaded thrust rod 21 is shifted toward the right (Figure 34) by the abutment rod 22 to shift the indicator dial 36 to its zero position. During the positioning cycle, the thrust rod 21 contacts the measuring rods and shifts the rods toward the right against feeler rod 23 to deflect the dial indicator 36 back to zero at final position of the table and work.

For purposes of illustration, the coaxial thrust rod 21 and feeler rod 23 are shown in Figure 5 displaced from their true positions, the actual location being indicated in Figure 13. The graduations of the indicating rings 87 are so arranged that the numbers corresponding to the selected dimension are aligned with the reference line 100 (Figure 4) when the selected rods are rotated into alignment with the thrust and feeler rods. It will be noted at Figures 12 and 13, that the ten-inch measuring rods, when shifted to measuring position, are also aligned with rod 21. The one-inch rods 17, as indicated in Figure 24, are coaxial with the decimal rods, such that the selected rods of all three sets are in axial alignment with the thrust rod and feeler rod.

In order to index the decimal rods accurately in measuring position, each of the four decimal dials is provided with a detent wheel 101 (Figures 5 and 7). Each detent wheel has a series of notches 102 around its periphery related with the ten rods of each dial. The respective detent wheels are secured upon the counter-turned portion 103 of each dial adjacent the indicator ring. Each dial is latched in its selected position by a detent roller 104 tracking upon the periphery of the detent wheel and selectively engaging the notches (Figure 7). The detent roller is rotatably journalled as at 105 upon an arm 106 having its upper end pivotally connected as at 107 to the dial housing. A compression spring 108 has its inner end seated as at 110 against the lower end of the arm 106. The outer end of the spring is seated against a plug 111 threaded into the dial housing, the spring thus urging the detent roller yieldably against the detent wheel. When the roller is engaged in one of the notches of the detent wheel, the selected measuring rod is located in axial alignment with the rods 21 and 23 (Figure 13).

As indicated in Figures 37 and 38, the control unit 24 is mounted directly upon the end wall 83 of the dial housing.

It is thus located with its plunger 23 projecting through a bore 112 formed in the end wall 83 of the dial housing for endwise engagement with the measuring rods. The housing of the control unit is attached directly to the end wall 83 such that the two parts form a unit supported by the cross slide.

*Ten-inch measuring rods*

As indicated in Figures 4, 24 and 25, the ten-inch measuring rods 18 are located within the elongated housing 67 which extends from the dial housing. As noted earlier, the ten-inch rods are selected by the dial 61 which is connected to the selector shaft 68 by the gear train 70. Dial 61 is graduated from "0" to "4" (Figure 4), the four ten-inch rods being successively advanced from zero position to the measuring position as the dial is advanced. The dial is provided with a detent wheel 113 having a set of five notches corresponding to the five graduations of the dial and indexed by a detent roller as described above.

Referring to Figure 24, the elongated housing 67 consists of an elongated support bracket 114 which is generally channel shaped in cross section pivotally mounting the ten-inch rods. Bracket 114 is attached by screws 115 to the forward edge of the cross slide. The bracket includes a coextensive cover 116 attached to the bracket by the screws 117. The bracket and cover plate extend to the forward wall 118 of the dial housing which is also secured upon the edge of the cross slide 5 as explained earlier. The dial housing and measuring rod housing thus form a unitary structure mounted upon the cross slide.

The one-inch measuring rods 17 are also enclosed within housing 67 to the left of the ten-inch measuring rods as shown in Figure 4. As explained earlier, the one-inch rods are carried by the table for movement with the table relative to the ten-inch measuring rods and decimal measuring rods. For this purpose, the one-inch rods 17 are mounted in a turret indicated generally at 120. The turret in turn is rotatably supported by the slide block 121 attached to the table and projecting through the slot 122 of housing 67.

As indicated in broken lines in Figures 4 and 24, the selected ten-inch rods are shifted upwardly in a rocking motion into coaxial alignment with the selected one-inch rod and with thrust rod 21. The selected ten-inch rods thus act as spacers between the selected one-inch rods and decimal rods as indicated in Figure 35. It will be noted in Figure 24, that the ten-inch rods normally reside below the plane of movement of the one-inch rod turret, such that the turret is free to pass over the inactive ten-inch rods as it shifts with the table toward the right for engagement with the seleced ten-inch rods.

Referring to Figures 5 and 9, the dial 61 for selecting the ten-inch measuring rods, is rotatably journalled relative to a boss 123 projecting from the intermediate wall 84 of the dial housing. Boss 123 has a terminal bore 124 concentric with the drive shaft, the thrust rod 21 projecting from a bore 124a into bore 124 for cooperation with the decimal measuring rods. Dial 61 is secured to the hub 125 of a gear 126 rotatably mounted upon boss 123 and forms a part of gear train 70 previously identified.

Referring to Figure 9, gear 126 meshes with an idler gear 127 journalled on a countershaft 128 in the lower portion of the dial housing. Gear 127 includes a pinion 130 meshing with a gear 131 secured to a stud shaft 132. The stub shaft 132 is rotatably journalled in the intermediate wall 84 of the die housing. To the opposite end of stub shaft 132 there is secured a disk 133 including a crank pin 134. A link 135 has one end pivotally connected to crank pin 134 and has its opposite end connected to a pivot pin 136 carried by a crank arm 137. Arm 137 in turn is secured to the selector shaft 68 of the ten-inch rods.

The position of the parts shown in Figure 13 corresponds to the zero position of the dial. As the dial is rotated from zero to select the measuring rods, the disk 133 is rotated in the direction indicated by the arrow (Figure 12). For each calibration of the dial, the crank pin 134 is advanced by the gear train to one of the angular positions 138 indicated in broken lines in Figure 12. These advancements of the crank pin swing the crank arm 137 successively to the angular positions indicated at A to D in broken lines in Figure 12. Therefore, upon advancement of the dial from "0" to "4," the selector shaft is rotated in steps through the angles A to D, one advancement for each calibration of the dial. The stepwise rotation of the selector shaft causes the successive elevation of the four measuring rods to active position in alignment with thrust rod 21 (Figure 12). For this purpose, the selector shaft 68 is provided with four selective clutches, indicated at A' to D' in Figures 4, 18, and 19, one clutch for each measuring rod. These clutches are arranged to pick up the successive measuring rods in sequence in response to the rotary motion of shaft 68 through the angles A to D.

Described in detail with reference to Figures 4 and 25, selector shaft 68 is rotatably journalled by a series of bearing blocks 140 secured to the bracket 114. The ten-inch measuring rods are slidably mounted within rocking brackets 141. Each bracket comprises a pair of rocker arms 142 and 143 joined by a brace member 144. The measuring rods are slidably carried in bores formed in the swinging ends of the arms. Each measuring rod is biased toward the left by a compression spring 145 having one end seated against a sleeve 146 which is confined on the measuring rod by a snap ring 147 (Figure 25). As shown in this view, the rocker arm 143 of each bracket is loosely journaled upon the selector shaft 68 and locked axially by a collar 148. The other arm 142 of each bracket is attached by a set screw 150 to a driven collar 151. Each driven collar 151 forms a part of one of the selective clutches A' to D'.

The principle of operation of the series of selective clutches A' to D' is illustrated diagrammatically in Figures 18 and 19. It is to be understood that these views do not represent the actual construction of the clutches and measuring rod brackets, since certain of the parts are relatively reversed in position to bring out more clearly the cooperation of the parts. The position of the parts in Figure 18 corresponds to the zero position of the ten-inch selector dial 61, the measuring rods being lowered to their inactive position corresponding to that indicated in Figure 34. Upon rotation of shaft 68 through the angles A to D, the selective clutches elevate their respective measuring rods, beginning with clutch A' of the series. Thus, upon advancement of the shaft 68 through the angles A, B, and C, the first three clutches A', B' and C' are acted upon to elevate the measuring rods as shown in Figure 19, corresponding to the position of the parts shown in Figure 35.

The construction of the selective clutches is illustrated in detail in Figures 15 to 17 which represents the first clutch A' of the series. To more clearly illustrate the structure, the components of the clutch are shown separated from one another in Figure 15, the actual relationship being illustrated in Figures 4 and 25. As shown in Figure 15, the driven collar 151 is rotatably journalled upon shaft 68 and is rotated by a selector collar 152. The driven collar 151 is secured upon the rocker arm 142 of the measuring rod bracket 141 as noted earlier. Selector collar 152 is rotated by a driving collar 153 which is secured to shaft 68 by a set screw 154. Rotation of the shaft in the direction indicated is transmitted from driving collar 153 to the selector collar 152 by a torsion spring 155 having one end anchored as at 156 to the driving collar and its opposite end anchored as at 157 to the selector collar. The purpose of spring 155 is to provide a yieldable driving connection for elevating the measuring rods in sequence. In other words, after each measuring rod is elevated, its torsion spring winds up to allow the shaft 68 to be rotated to elevate the remaining rods.

As shown in Figure 16, the driving collar 153 includes a stop dog 158 which normally resides in abutment with a similar dog 160 of selector collar 152. In the zero position, with the measuring rod lowered, spring 155 is slightly preloaded in a direction to urge dog 160 against dog 158 as indicated by the arrow in Figure 16. Upon rotation from the zero position, driving collar 153 rotates its dog 158 away from dog 160, as indicated in Figure 16, such that the rotation of the driving collar is transmitted through the spring to the selector collar 152. The dogs 158 and 160 of the four clutches are in contact with one another in the lowered position of the rods (Figure 18) and separate in sequence, beginning with clutch A', as the several rods are elevated (Figure 19).

The rotary motion of each selector collar 152 is transmitted to its driven collar 151 by a driving dog 161 of the selector collar which engages a driven dog 162 of the driven collar. Referring to Figures 20 to 23, representing the zero position of the parts, it will be noted that the dogs 161 and 162 of the first clutch A' are in contact with one another. It will also be noted that the driving dogs of the three clutches B' to D' are spaced angularly from the driven dogs at successively increasing angles. The angle of rotation which is imparted to the respective dogs of the series as indicated at A to D, corresponds to the angles of rotation of shaft 68. Accordingly, upon rotation of the shaft through its angle A, driven dog 161 of clutch A' advances through the angle A to drive the driven dog 162 to the position shown in broken lines in Figure 20. This rocks the driven collar 151 and measuring rod bracket to the position shown in Figure 19 to elevate the first measuring rod. The rocking motion of the measuring rod bracket is limited by a stop screw 163 (Figure 27), each clutch being provided with a similar stop arrangement as described later.

As the dial is rotated to select the next measuring rod, spring 155 of clutch A' winds up to permit additional rotary shaft motion as noted above. It will be understood that during the motion of the shaft through angle A, the selector collar 152 of clutches B', C' and D' are also rotated, advancing their driving dogs 161 toward the driven dogs 162. Upon rotation of shaft 68 through angle B, the driving dog of clutch B' advances the driven dog to elevate the second measuring rod. It will be understood that the driving dogs of clutches C' and D' in the same manner advance and elevate the third and fourth in the measuring rods during rotation of the shaft through angles C and D.

As indicated above, the spring of each clutch begins to wind up after its measuring rod is elevated since the stop screw 163 limits the elevated position of the rods. The stop screws position the rods accurately in alignment with one another and with thrust rod 21 counter to the spring pressure.

When the dial 61 is rotated back toward zero to lower the rods, the last measuring rod of the series is lowered first, followed successively by the lowering of the forward rods. Thus, as shown in Figure 19, the rod of clutch C' is first lowered, the stop dog 158 of its driving collar being advanced against stop dog 160 to rotate the selector collar 152 and driven collar 151 in the direction to lower the rod. Continued rotation of the shaft in the lowering direction successively brings the stop dogs of stations B' and A' into contact in the same manner. Accordingly, when the dial reaches its zero setting, the three rods are lowered to inactive position.

As indicated in Figure 26, a stop screw 164, similar to stop screw 163, limits the motion of the measuring rods in their lowered position. To accommodate the stop screws, the lower portion of the driven collar is relieved as at 165 to provide the shoulders 166—166 which engage the upper ends of the stop screws in the two positions of the measuring rod. The stop screws are threaded through the wall of housing 67 and the stop screws of the several clutches are adjusted to locate the measuring rods collectively in alignment with one another. The screws are locked in adjusted position by the nuts 167 threaded upon their lower ends and bearing against the surface of the housing.

It will be noted that the ten-inch rods and associated parts naturally tend to swing by gravity to their lowered position. In order to reduce the force required to elevate the rods and to maintain them in elevated position, a compensating tension spring 168 is utilized (Figure 13). The upper end of the spring is anchored to the pivot pin 136 and the lower end of the spring is anchored to a pin 170 secured to the bottom of the dial housing 60. The spring thus exerts tension upon the crank arm in a downward direction, tending to rotate shaft 68 through the angles A to D to elevate the measuring rods and to rotate the dial 61 from its zero position. The spring thus reduces the turning resistance of the dial. As explained earlier, the dial is provided with a detent wheel 113 (Figure 5) to index the dial in its selected positions. The detent notches, aided by the compensating spring, thus hold the selected measuring rods in selected position.

It will be noted that the ends of the measuring rods are tapered as at 97, similar to the ends of the decimal measuring rods, providing a flat anvil surface 98 which acts as a gage surface. Sufficient clearance is provided between the flats of adjacent rods to allow the rods to be shifted relatively without interference. The compression springs 145, noted earlier, acting against the sleeves 146 normally maintain the rods longitudinally in fixed position relative to one another. During movement of the table toward the right during the positioning cycle, the left end of the selected rod or rods is engaged by the selected one-inch rod which moves with the table and is shifted toward the right against thrust rod 21. The positioning motion of the one-inch rod thus shifts the measuring rods toward the right, compressing the springs 145 and the thrust rod spring 95 as the thrust rod contacts the decimal rods. These in turn shift the feeler rod 23 of the indexing unit to control the positioning movement as described earlier.

*Modified ten-inch rod selector mechanism*

The mechanism illustrated in Figures 44 to 47 utilizes a system of cams for shifting the ten-inch measuring rods, as distinguished from the selective clutches shown in Figures 15 to 24. The cam operated selector shifts the rods into alignment individually in sequence upon advancement of the ten-inch dial from one calibration to the next as described above.

As shown in Figures 44 and 46, the cams indicated generally at 172, are connected to the ten-inch dial by the gear train 70, previously described, the gear train being modified to include an idler gear 173 which drives the cams in a direction reversed from that shown in Figure 12, as indicated by the arrow. The cams are secured in common upon the shaft 132 previously described, the center of the shaft being repositioned downwardly to accommodate the idler gear 173.

Referring to Figure 46, the four cams have leading edges 174 located in four angular positions, such that the four leading edges are advanced successively as the shaft is rotated in stepwise fashion upon rotation of the dial from one graduation to the next. The tracking surface or arc 175 of each cam is concentric to shaft 132 and the cams are spaced axially along the shaft. Each cam comprises a circular sector, the arcs having respective lengths as indicated by the angles E to H from their leading edges to their common trailing edge 176.

As best shown in Figure 44, there is provided a series of four cam rollers 177 each pivotally mounted in the swinging end of a respective cam lever, one lever for each ten-inch measuring rod. The cam levers are indicated at E' to H' and they are actuated in sequence by the leading edges E to H. The four levers E' to H' are mounted upon a common axis with their rollers normally aligned with one another (Figure 46). The arms and their rollers are spaced axially from one another and reside in the planes of the respective cams, the rollers normally disposed adjacent the leading edges of the cams to be sequentially actuated upon cam rotation (Figure 47).

The respective levers are secured upon coaxial, telescopically arranged tubes and a central rod, the tubes and rod being relatively rotatable (Figure 44). The outer end portions of the tubes and rod carry the rocker arms 142 and 143 for the ten-inch measuring rods. Thus the first tube 180 actuates the first measuring rod of the series, the tubes 181 and 182, and rod 183 projecting outwardly from the first tube in increasing lengths corresponding to the series of measuring rods which they actuate. For simplicity, the bearings and other details are disclosed only in relation to the first tube 180, the structure being identical for the several tubes and rod. As shown, the first tube 180 is rotatably supported in a pair of spaced bearing blocks 184, the rocker arms 142 and 143 residing between the bearings. The tube is confined against axial motion by the collars 185 residing between the bearing blocks and arms. The rocker arms are secured to the tube by soldering or brazing. To urge the measuring rods normally to their lowered inactive position, a collar 186 is secured to the tube adjacent the left bearing block 184. A torsion spring 187 has one end anchored to the collar as at 188 and has its opposite end anchored as at 190 to the bearing block. Spring 187 is slightly preloaded to urge the tube in a direction to lower the measuring rod. The measuring rod is located in active and inactive positions by the stop screws 163 and 164 previously described, which engage the stop collar 191 secured to the tube. A similar structure is provided for each measuring rod of the series.

Referring to Figure 46, the angles E to H, which indicate the increasing lengths of the arcs of the cams, correspond to the degree of rotation imparted to the cams upon each stepwise advancement of the dial from one graduation to the next. Accordingly, when the dial is advanced from zero to the first graduation, the leading edge 174 of the first cam engages the cam roller 177 of lever H', which is secured upon tube 180. This shifts the cam lever as indicated in Figure 47, rotating tube 180 in a direction to elevate the first measuring rod to active position in alignment with thrust rod 21. During the next stepwise advancement, the leading edge of the next cam engages the roller of lever G' in a similar manner to rotate tube 181 and thus elevate the second measuring rod of the series. Stepwise rotation of the cams through the remaining angles is effective to elevate in sequence the remaining measuring rods.

As noted above, the tracking surfaces or arc of the several cams is concentric from the successive leading edges to the common trailing edge. Accordingly, after the first cam actuates lever H', its roller continues to track against the arc H as the cams are advanced to actuate the successive levers. The rollers of the successively actuated cam levers similarly track against their related cams, thus locking the measuring rods in elevated position. It will be understood that the torsion springs urge the rods to lowered position when the cams are rotated in the opposite direction. In this case, the rods are shifted to lowered position in reverse order because of the arrangement of the cams.

*One-inch measuring rods*

As indicated earlier, the rotatable turret 120 which carries the one-inch measuring rods is rotatably supported by the slide block 121 clamped to the table for movement of the turret with the table (Figure 4). The turret is rotated by the hexagonal selector shaft 71 which is in driving connection with dial 62 by way of the gear train 72. The hexagonal shaft extends from the dial housing through the elongated housing 67 and its outer portion is slidably keyed to the turret to rotate the turret in response to rotation of dial 62.

Referring to Figure 5, the one-inch selector shaft 71 is coaxial with the dial shaft 82 and its end portion includes a pilot shaft 192 rotatably journalled in the dial shaft. The one-inch dial 62 is rotatably journalled relative to the boss 123 adjacent dial 61 of the ten-inch rods. Dial 62 is keyed upon the hub 193 of a gear 194 which is rotatably journalled upon boss 123 and forms a part of the gear train 72. As best shown in Figures 8 and 10, gear 194 meshes with a gear 195 secured to the countershaft 128 previously noted, which is rotatably journalled in the dial housing. Shaft 128 drives a pinion 196 fixed to its outer end and meshing with an idler gear 197. Idler 197 is rotatably journalled upon a stub shaft 198 projecting from the end wall of the dial housing and meshes with a gear 200 which is secured upon the pilot shaft 192 of selector shaft 71.

It is to be noted that the drive from the dial gear 194 to its meshing gear 195 produces a one to two ratio increase. However, the drive from gear 196 to the selector shaft gear 200 provides a reducing ratio from two to one. Therefore, the selector shaft 71 and turret are rotated at the same rate as the dial 62 and in the opposite direction as indicated by the arrows in Figure 8. The indicating ring 87 of the dial is provided with ten equally spaced calibrations around its circumference from "0" to "9" as described with reference to the decimal dials. It is rotated from its zero position in the direction indicated by the arrow to advance the measuring rods from zero in one-inch increments. As the dial is advanced, the turret is rotated in the direction indicated by the arrows in Figures 29 and 33 to align the selected one-inch rod with the ten-inch rod as indicated in Figure 24.

The slide block 121, which rotatably supports the turret, is mounted upon the forward edge of the table as shown in Figures 4 and 24 and is slidably engaged in a T-slot 201 formed in the table. Referring to Figure 4, the slide block includes a pair of T-nuts 202—202 secured by screws 203 passing through the slide block. The T-nuts slidably engage the slot and adapt the block and turret to be adjusted longitudinally along the front of the table.

The slide block is clamped in its adjusted position by a pair of clamps indicated generally at 204 which are actuated by the handles 205. Each clamp consists of a T-nut 206 slidably engaged in slot 201 adjacent the nuts 202. Each T-nut 206 is threaded to a stud 207 (Figure 24) having a cylindrical head 208 slidably confined in a bore formed in the slide block. The head includes a tapered socket 210 providing a camming surface for the tapered end 211 of a clamping screw 212 which is threaded into the slide bar. The handle 205 is keyed to the upper portion of the clamp screw and is confined axially by the screw 213. The axis of the tapered socket is offset laterally from the axis of the clamping screw, such that the tapered end of the clamping screw cams the head outwardly as the screw is tightened by the clamping lever. This draws the T-nut toward the slide block to lock the block in its adjusted position along the table.

As best shown in Figure 28, the turret 120 is rotatably supported between the bearing arms 214 and 215 which project laterally through the slot 122 of housing 114. The slot is coextensive with the housing to allow the slide block and turret to be adjusted for the full length of the housing. To prevent the entry of dust and dirt into the housing, lineal seals (not shown) are mounted along the slot. The seals are of conventional design and close off the slot without interfering with the arms of the slide block as it is adjusted.

As detailed in Figure 31, the turret is of sectional construction and includes a sleeve 216 slidably confined on the hexagonal selector shaft 71. One end of the sleeve is rotatably journalled in arm 214 of the slide block. The opposite end of the sleeve includes a head 217 having a series of measuring rod bores equally spaced from one another and concentric to the axis of the turret as shown in Figure 30. The bores of the head are located upon a circle concentric to the corresponding bores of the decimal measuring rods, the turret and decimal dials being mounted upon a common axis. Each one-inch measuring rod has an end slidably confined in a respective bore in head 217 and has its opposite end confined in the bore of a respective lug 218 projecting radially from an individual mounting collar 220. The collars 220 are fitted upon the sleeve 216 in endwise contact, and each has a length corresponding to the length increments of the measuring rods. Accordingly, the lugs 218 are located outwardly in steps from head 217, and related to the ends of the rods. The lugs 218 are disposed radially around the turret as shown in Figure 29 in alignment with the bores of head 217 and each sleeve is locked in its radial position by a set screw 221 engaging the sleeve 216 (Figure 32).

The end of the turret adjacent head 217 is supported by a bushing 222, rotatably journalled in the arm 215 of the slide block. Head 217 resides adjacent the inner surface of arm 215. The outer end portion of bushing 222 includes a hexagonal bore 223 slidably interfitting shaft 71 and keying the bushing to the shaft. The inner end portion of bushing 222 interfits a bore 224 formed in the head 217, and a set screw 225 passes through the sleeve 216 and engages the bushing. The set screw keys the turret to the bushing and the bushing in turn is keyed to the hexagonal shaft, such that the turret is rotated with the shaft relative to the bearing arm.

Bushing 222 includes a head 226 having a series of detent sockets 227 which correspond in number and spacing to the measuring rods (Figure 31). The detent sockets are engaged by a ball 228 confined in bore 230 formed in arm 215. A compression spring 231 has one end seated against the ball and has its opposite end seated against a plug 232 threaded into the end of bore 230. The turret is confined against endwise motion between the bearing arms by the bosses 233 of arms 214 and 215 which bear against opposite ends of the turret. As indicated in the development shown in Figure 33, the shortest measuring rod, which corresponds to the zero setting, is confined in a lug 218 residing in contact with head 217. The rods increase in increments of one inch from the zero rod as indicated, the longest rod being nine inches longer than the zero rod. The detent sockets index the turret in its ten radial positions to locate the selected rod in alignment with the selected ten-inch rod, as indicated in Figure 24.

The abutment rod 22, previously identified, is mounted in a bore 234 of arm 215 (Figure 31). The center of rod 22 corresponds to the axis of the selected measuring rod as indicated in broken lines in Figure 24. The arm 215 shifts with the table during the positioning movement and rod 22 provides a gage surface contacting the end of the selected one-inch rod.

The purpose of slide block 121 is to allow the measuring apparatus to be initially set up without moving the table or work piece. By way of example, in setting the apparatus at the start of a jig boring operation, the first reference point of the work, such as a hole, is brought into alignment with the axis of the spindle. This is accomplished in a conventional manner, utilizing suitable instruments, the work usually being clamped to the table and the table shifted until the reference hole is in accurate alignment with the spindle axis. Prior to this operation, the measuring dials preferably are set at zero.

To relate the measuring apparatus to the reference hole, the slide block is unclamped and shifted to the right to cause the zero rod of the one-inch turret to contact and depress the thrust rod 21. This corresponds to the position of the parts shown in broken lines in Figure 34, the one-inch rod, thrust rod and decimal rods being confined endwisely between the abutment rod 22 and feeler rod 23. It will be understood that the slide block is adjusted carefully to depress the feeler rod 23 until the feeler rod deflects the dial indicator to its zero setting. The slide block is clamped to the table in this position.

To locate the next hole, the table is shifted toward the left a sufficient distance to provide clearance for the measuring rods. Thereafter, the dials are set to the required dimension, then the table is shifted to the right against the measuring rods to locate the new hole relative to the reference hole for the machining operation. After the initial reference hole or surface is related to the measuring apparatus, the additional hole centers are located quickly and accurately by appropriately shifting the table and resetting the dials to each required dimension.

Having described our invention we claim:

1. A selective measuring apparatus for locating a lineally movable machine element relative to a stationary element, said measuring apparatus comprising, a respective measuring abutment mounted on the movable and stationary machine elements, said abutments normally spaced apart along a common axis for relative lineal motion, a shiftable selector mounted upon one of said machine elements and residing between said spaced abutments, a first set of graduated length measuring rods mounted in said selector, said rods residing in positions to be selectively aligned with the axis of the abutments upon shifting of the selector, a second shiftable selector mounted upon the other of said machine elements and residing between said abutments, a second set of graduated length measuring rods mounted in said second selector, said measuring rods residing in positions to be selectively aligned with the axis of the abutments upon shifting of the selector, a transversely shiftable measuring rod carried by one of said machine elements and extending parallel to the axis of the abutments, said transversely shiftable measuring rod normally spaced outwardly in a position remote from the path of relative lineal motion of the first and second selectors for movement of the measuring rods thereof into endwise abutment with one another, and means connected to said rod for shifting the same transversely into alignment with the axis of the abutments, the aligned measuring rods providing an additive length measurement disposed between said spaced abutments for locating the lineally movable element.

2. A selective measuring apparatus for locating a lineally movable machine element relative to a stationary element, said measuring apparatus comprising, a respective measuring abutment mounted on the movable and stationary machine elements, said abutments normally spaced apart along a common axis for relative lineal motion, a rotatable selector mounted upon one of said machine elements and residing between said spaced abutments, a first set of measuring elements mounted in said selector in positions to be selectively aligned with the axis of the abutments upon rotation of the selector, a second rotatable selector mounted upon the other machine element and residing between said abutments, a second set of measuring elements mounted in said second selector in positions to be aligned selectively with the axis of the abutments upon rotation of the second selector, a third transversely shiftable measuring element carried by one of said machine elements and extending parallel to the axis of the abutments, said transversely shiftable measuring element normally residing along an axis spaced outwardly from the common axis of the measuring abutments in a position remote from the path of relative lineal movement of the first and second selectors for movement of the measuring rods thereof into endwise abutment with one another upon relative lineal motion of the said machine elements, and means connected to the third measuring element for shifting the same into alignment with the axis of the abutments, the aligned measuring elements providing an additive measurement engageable between said abutments to locate the lineally movable machine element relative to the stationary element.

3. A selective measuring apparatus for locating a lineally movable machine element relative to a stationary element, said measuring apparatus comprising, a respective measuring abutment mounted on the movable and stationary machine elements, said abutments normally spaced apart along a common axis for relative lineal motion, a rotatable selector mounted upon one of said machine elements and residing between said spaced abutments, a set of graduated length measuring rods slidably mounted in said selector parallel to the axis of the abutments, said rods residing in positions to be selectively aligned with the axis of the abutments upon rotation of the selector, a second rotatable selector mounted upon the other of said machine elements and residing between said abutments, a set of length measuring rods slidably mounted in said second selector parallel with the axis of the abutments, said measuring rods residing in positions to be selectively aligned with the axis of the abutments upon rotation of the selector, a series of transversely shiftable measuring rods carried by one of said machine elements and extending parallel to the axis of the abutments, said transversely shiftable measuring rods normally residing along an axis remote from the path of relative lineal motion of said first and second selectors adapting the aligned measuring rods thereof to be shifted into endwise abutment with one another upon relative motion of the said machine elements, and means connected to said rods for shifting the same individually into alignment with the axis of the abutments, the aligned measuring rods providing an additive length measurement disposed between said spaced abutments for locating the lineally movable element.

4. A selective measuring apparatus for locating a lineally movable machine element relative to a stationary element, said measuring apparatus comprising, a respective measuring abutment mounted on the movable and stationary elements and normally spaced apart along a common axis for relative lineal motion, a series of shiftable decimal selectors mounted upon one of said machine elements and residing between said spaced abutments, a series of length measuring elements mounted in each of said selectors and residing parallel with the axis of the abutments in positions to be selectively aligned therewith upon shifting of the selector, the measuring elements having length increments in the respective orders of tenths, hundredths, thousandths and ten-thousandths of a given unit of measurement, one order for each selector, a second shiftable selector mounted upon the other of said machine elements and residing between said abutments, a second series of length measuring elements mounted in said second selector and residing parallel with the axis of the abutments in positions to be selectively aligned with the axis of the abutments upon shifting of the selector, the measuring elements of the second selector having length increments each equal to one of said units of measurement, a third series of measuring elements shiftably mounted on one of said machine elements and extending parallel to the axis of the abutments, said third series of measuring elements arranged in endwise relationship, said third series of measuring elements normally residing along an axis spaced outwardly from the common axis of the abutments remote from the path of relative lineal motion of the first and second selectors for movement of the length measuring elements thereof into endwise abutment with one another upon relative motion of said machine, and means connected to said third series of measuring elements for shifting the same transversely into alignment with the axis of the abutments, each measuring element of said third series having a length equal to a multiple of said measuring unit, the selected measuring elements which are shifted into alignment with the axis of the abutments providing an additive length measurement for locating the lineally movable machine element and related abutment upon movement thereof toward the stationary abutment.

5. A selective measuring apparatus for locating a lineally movable machine element relative to a stationary element, said measuring apparatus comprising, a respective movable and stationary abutment mounted on the movable and stationary machine elements, said abutments normally spaced apart along a common axis for relative lineal motion, a rotatable selector mounted on the stationary machine element upon an axis parallel to the axis of the abutments, said selector residing between the abutments and adjacent the stationary abutment, a first set of graduated length measuring elements mounted in the selector parallel to the axis of rotation thereof, said measuring elements spaced from one another in a circle concentric to the axis of the selector and passing through the axis of the abutments to be selectively aligned with the axis of the abutments upon rotation of the selector, a second rotatable selector mounted upon the movable machine element upon an axis parallel to the axis of the abutments, means connected to the second selector for rotating the same, the second selector residing between the abutments and adjacent the movable abutment, a second set of graduated length measuring elements mounted in the second selector parallel to the axis thereof, said elements spaced from one another in a circle concentric to the axis of the second selector and passing through the axis of the abutments to be selectively aligned with the axis of the abutments upon rotation of the second selector, a third length measuring element extending parallel to the axis of the abutments, means connecting the third length measuring element to one of said machine elements for transverse motion relative to the axis of the abutments, the third measuring element normally residing along an axis spaced transversely from the axis of the abutments, and remote from the path of lineal motion of the second selector adapting the measuring elements thereof to be shifted into endwise abutment with the measuring elements of the selector on the stationary machine element upon lineal motion of the movable machine element and second selector, and means connected to the third measuring element for selectively shifting the same transversely into alignment with the axis of the abutments and between the aligned measuring rods of the first and second selectors, said aligned measuring elements providing an additive measurement between the abutments for locating the movable element relative to the stationary element.

6. A dial operated measuring apparatus for locating a lineally movable machine element relative to a stationary element, said measuring apparatus comprising, a respective movable and stationary measuring abutment mounted on the movable and stationary machine elements, said abutments normally spaced apart along a common axis for relative lineal motion, a dial housing mounted on one of said machine elements, a series of rotatable decimal selector dials mounted in said dial housing on a common axis and residing between said abutments, a respective set of length measuring elements slidably mounted in each of said selector dials and residing parallel to the axis of the abutments, the respective sets of measuring elements arranged in increasing decimal length increments in the order of tenths, hundredths, thousandths and ten-thousandths of a given unit of measurement, one order for each set of measuring elements, said sets of measuring elements spaced apart in a common circle passing through the axis of the abutments in positions to be selectively aligned with the axis of the abutments upon rotation of the respective selector dials, a unit selector mounted upon the other of said machine elements and residing between the abutments, a set of unit length measuring elements mounted in the second selector and residing parallel to the axis of the abutments, said set of unit measuring elements having length increments equal respectively to one of said measuring units, said elements spaced apart in a circle passing through the axis of the abutments in positions to be selectively aligned with the axis of the abutments upon rotation of the second selector, a rotatable unit selector dial mounted in said dial housing upon the common axis of said decimal selector dials, and a driving system providing a driving connection from said unit selector dial to said unit selector for rotating the unit selector upon rotation of the unit dial, said driving system being slidably connected to the unit selector and providing relative lineal motion of said dial housing and unit selector upon lineal motion of the movable machine element, the aligned decimal and unit measuring elements being slidable into endwise engagement with one another between said abutments upon lineal motion of the movable machine element and movable abutment toward the stationary abutment, thereby providing an additive measurement locating the movable machine element relative to the stationary element.

7. A dial operated measuring apparatus for locating a lineally movable machine element relative to a stationary element, said measuring apparatus comprising, a dial housing mounted on one of said machine members, a turret bracket mounted on the other of said elements and spaced lineally from the dial housing, a respective measuring abutment mounted on said dial housing and turret bracket and disposed along a common axis for relative lineal motion, a series of selector dials rotatably mounted in said housing upon a common axis and residing adjacent one another between said measuring abutments, said common axis being parallel to the axis of the abutments, a respective set of incremental measuring elements in each of said dials, the measuring elements located in a common circle passing through the axis of the abutments, a selector turret rotatably mounted in said turret bracket, said turret residing between said abutments, a set of incremental measuring elements in said turret spaced from one another in a common circle passing through the axis of the abutments, a turret selector dial rotatably mounted in said dial housing upon said common axis, and means providing a driving connection from the turret selector dial to the turret, the incremental measuring elements of the dials and turret being selectively aligned with said abutments upon rotation of said dials, the aligned measuring elements providing an additive length measurement between the abutments which locates the movable element relative to the stationary element.

8. A dial operated measuring apparatus for locating a lineally movable machine element relative to a stationary element, said measuring apparatus comprising, a dial housing mounted on one of said machine members, a turret bracket mounted on the other of said elements and spaced lineally from the dial housing, a respective measuring abutment mounted on said dial housing and turret bracket and disposed along a common axis for relative lineal motion, a series of selector dials rotatably mounted in said housing upon a common axis and residing between said measuring abutments, said common axis being parallel to the axis of the abutments, a respective set of incremental measuring elements in each of said dials, the measuring elements located in a common circle passing through the axis of the abutments, a selector turret rotatably mounted in said turret bracket and having an axis common to the axis of the selector dials, said turret residing between said abutments, a set of incremental measuring elements in said turret and spaced from one another in said common circle passing through the axis of the abutments, a rotatable turret shaft extending from the dial housing and passing through the turret, means slidably keying the turret to said shaft for lineal movement of the turret along the shaft, a turret selector dial rotatably mounted in said dial housing upon said common axis and residing adjacent said series of selector dials, and means providing a driving connection from the turret selector dial to the turret shaft for rotating the shaft and turret, the incremental measuring elements of the dials and turret being selectively aligned with said abutments upon rotation of said dials, the aligned measuring elements providing an additive length measurement between the abutments which locates the movable element relative to the stationary element.

9. A dial operated measuring apparatus for locating a lineally movable machine element relative to a stationary element, said measuring apparatus comprising, a dial housing mounted on the stationary element, a turret bracket, a respective measuring abutment mounted relative to the dial housing and turret bracket along a common axis for relative lineal motion, slide means securing the turret bracket to the movable element for lineal adjustment of the bracket relative to said movable element along the common axis of the abutments, a series of selector dials rotatably mounted in said dial housing between the abutments upon a common axis, a respective set of incremental measuring elements in each of said dials, said sets of measuring elements located in said dials upon a common circle passing through the axis of the abutments, a selector turret rotatably mounted upon said turret bracket, said turret residing between said abutments, a set of incremental measuring elements in said turret and spaced apart in a common circle passing through the axis of the abutments, a turret selector dial mounted in said dial housing upon said common axis, driving means connecting the turret selector dial to said turret for rotating the turret in response to rotation of the dial, the slide means of the turret bracket adapting the movable element to be adjusted lineally to a reference position relative to the measuring apparatus, the measuring elements of the dials being selectively aligned with the axis of the abutments and providing an additive length measurement between the abutments locating the movable element relative to the base reference position.

10. A dial operated measuring apparatus for locating a lineally movable machine element relative to a stationary element, said measuring apparatus comprising, a dial housing mounted on the stationary element, a turret bracket, a respective measuring abutment mounted relative to the dial housing and turret bracket along a common axis for relative lineal motion, slide means securing the turret bracket to the movable element for lineal adjustment of the bracket relative to said movable element along the common axis of the abutments, a series of selector dials rotatably mounted in said dial housing between the abutments upon a common axis, a respective set of incremental measuring elements in each of said dials, said sets of measuring elements located in said dials upon a common circle passing through the axis of the abutments, a selector turret rotatably mounted upon said turret bracket and residing upon the common axis of the decimal dials, said turret residing between said abutments, a set of incremental measuring elements in said turret and spaced apart in said common circle passing through the axis of the abutments, a selector shaft extending along said common axis from the dial housing and passing through said turret, means slidably keying the turret to said shaft, a turret selector dial mounted in said housing upon said common axis, driving means connecting the turret selector dial to said selector shaft for rotating the shaft and turret in response to rotation of the dial, the slide means of the turret bracket adapting the movable element to be adjusted lineally to a reference position relative to the measuring apparatus, the measuring elements of the dials being selectively aligned with the axis of the abutments and providing an additive length measurement between the abutments locating the movable element relative to the base reference position.

11. A selective measuring apparatus for locating a lineally movable slide element relative to a stationary slideway, said measuring apparatus comprising, a dial housing having an elongated support element, said housing and support element mounted upon the stationary slideway parallel to the line of motion of the slide, a turret bracket secured to the slide for movement with the slide along said support element, a respective measuring abutment mounted relative to the dial housing and turret bracket along a common axis for relative lineal motion, a series of rotatable selector dials rotatably mounted in said dial housing upon a common axis parallel to the axis of the abutments and residing between the abutments, a first set of incremental measuring elements confined in each of said dials, the measuring elements of each set spaced apart in a circle passing through the axis of the abutments, a turret rotatably mounted upon said turret bracket and residing between the abutments upon the common axis of the selector dials, a second set of incremental measuring elements mounted in said turret and spaced apart in a circle passing through the axis of the abutments, a rotatable turret selector dial in driving connection with the turret for rotating the turret, a third set of measuring elements disposed in endwise relationship and extending parallel to the axis of the abutments, said measuring elements respectively providing length measurements in multiples of the increments of the first and second sets, said third set normally residing in a position transversely spaced from the axis of the abutments, and remote from the path of lineal motion of the turret adapting the measuring elements thereof to be shifted into endwise abutment with the measuring elements of the selector dials in response to lineal movement of the slide element toward the dial housing, respective mounting elements for said third set of measuring elements, said mounting elements spaced apart along the elongated support element and having ends pivotally connected thereto, the mounting elements having swinging ends movable transversely through an arc passing through the axis of the abutments, the third set of measuring elements mounted in said swinging ends in position to be shifted into alignment with the axis of the abutments between the selected measuring elements of the dial and turret, and selector means connected to the mounting elements for swinging the measuring elements thereof selectively into alignment with said axis, the aligned measuring elements of said three sets thereby providing an additive length measurement between the abutments for locating the slide relative to the slideway.

12. A selective measuring apparatus for locating a lineally movable slide relative to a stationary slideway, said measuring apparatus comprising, a housing having an elongated support element, said housing and support element mounted upon the stationary slideway parallel to the line of motion of the slide, a turret bracket secured to the slide for movement with the slide along said support element, a respective measuring abutment mounted relative to the housing and turret bracket along a common axis for relative lineal motion, a series of rotatable selectors mounted in said housing upon a common axis parallel to the axis of the abutments, a first set of incremental length measuring elements slidably confined in each of said selectors parallel to the axis thereof, the measuring elements of each set spaced apart in a circle passing through the axis of the abutments, a turret rotatably mounted upon said turret bracket and residing between the abutments upon the common axis of the selector dials, a second set of incremental length measuring elements mounted in said turret parallel to the axis thereof, said measuring elements spaced apart in a circle passing through the axis of the abutments, means connected to the turret for rotating the same, a third set of length measuring elements disposed in endwise relationship and extending parallel to the axis of the abutments, said third set normally residing in a position transversely spaced from the axis of the abutments and beyond the path of lineal turret motion adapting the turret to move with the slide along said third set toward the housing, respective mounting elements for said third set of measuring elements spaced along the elongated support element and having ends pivotally connected thereto, the mounting elements being movable transversely through an arc passing through the axis of the abutments, the third set of measuring elements slidably mounted in said swinging ends in position to be shifted into alignment with the axis of the abutments and between the aligned measuring elements of the first and second sets when the turret is shifted to a position outwardly from the housing, and selector means connected to the mounting elements for swinging the measuring elements thereof selectively into alignment with said axis, the aligned measuring elements being slidable into endwise engagement with one another between said abutments upon lineal motion of the slide and turret toward the housing, thereby providing an additive length measurment locating the slide relative to the slideway.

13. In a dial operated measuring apparatus for locating a lineally movable machine element relative to a stationary element, a respective measuring abutment mounted on the movable and stationary machine elements, said abutments normally spaced apart along a common axis for relative lineal motion, a selector dial rotatably mounted on one of said machine elements, a selector turret rotatably mounted on the other of said machine elements, a series of length measuring rods mounted in the turret parallel to the axis thereof, said measuring rods located upon a circle which passes through the axis of said abutments, a driving system connecting the selector dial to said turret for rotating the turret, said driving system providing a sliding connection which provides relative lineal motion of the selector dial and turret upon lineal motion of the movable machine element relative to the stationary element, said measuring rods having serially increasing lengths in a given unit of increments, said dial having an indicating graduation for each of said measuring elements, said measuring elements being selectively aligned with the axis of the abutments upon rotation of the dial, the graduations of the dial indicating the length of the aligned measuring element, the aligned measuring element being slidable into endwise engagement between said abutments to locate the movable element relative to the stationary element upon lineal motion of the movable element and related abutment toward the abutment of the stationary machine element.

14. In a dial operated measuring apparatus for locating a lineally movable machine element relative to a stationary element, a dial housing mounted on one of said elements, a turret mounting element mounted on the other of said elements, a respective abutment mounted relative to the dial housing and turret mounting element along a common axis for relative lineal motion, a turret rotatably mounted upon said turret mounting element and residing between said abutments, a set of incremental length measuring elements mounted in said turret, said measuring elements spaced apart in a circle passing through the axis of the abutments, a selector shaft extending parallel with the axis of the abutments from the dial housing and passing through said turret, means slidably keying the turret to said shaft, a turret selector dial rotatably mounted in said dial housing, and driving means connecting the turret selector dial to said shaft for rotating the shaft and turret in response to rotation of the dial, thereby to selectively align said measuring elements with the axis of the abutments, the aligned measuring element providing a length measurement engageable between the abutments to locate the movable element relative to the stationary element.

15. In a dial operated measuring apparatus for locating a lineally movable machine element relative to a stationary element, said measuring apparatus comprising a dial housing mounted on the stationary element, an abutment element mounted relative to the dial housing, a turret mounting element spaced from the dial housing and mounted upon the movable element, said turret mounting element having a pair of arms spaced apart from one another along the line of motion of the movable machine element, a second abutment element mounted in one of said arms in axial alignment with said first abutment element and normally spaced therefrom, a turret rotatably mounted between the arms of said turret mounting element and residing between said abutment elements, said turret confined endwisely between said arms for lineal movement with the movable machine element, a set of incremental measuring elements mounted in said turret, said measuring elements spaced apart in a circle passing through the axis of the abutment elements in positions to be rotated selectively into axial alignment with the abutment elements upon rotation of the turret, a selector shaft extending from the dial housing parallel to the axis of the abutment elements, means slidably keying the turret to said selector shaft for rotation of the turret with the shaft and lineal movement of the turret along the shaft, a selector dial rotatably mounted in said dial housing, and driving means connecting the dial to said selector shaft for rotating the shaft and turret in response to the rotation of the dial, thereby to align said incremental measuring elements selectively with the axis of the normally spaced abutment elements to provide a measurement therebetween upon movement of the movable element and turret toward the abutment element of the dial housing.

16. In a dial operated measuring apparatus for locating a lineally movable machine element relative to a stationary element, said measuring apparatus comprising, a dial housing mounted on the stationary element, an abutment element mounted relative to the dial housing, a turret mounting element spaced from the dial housing and mounted upon the movable element, said turret mounting element having a pair of arms spaced apart from one another along the lines of motion of the movable machine element, a second abutment element mounted in one of said arms in axial alignment with said first abutment element and normally spaced therefrom, a turret rotatably mounted between the arms of said turret mounting element and residing between said abutments, said turret confined endwisely between said arms for lineal movement with the movable machine element, a plurality of arms extending radially from said turret, a respective incremental measuring rod slidably mounted in each of said arms, said measuring rods residing parallel to the axis of the abutments in a circle passing through said axis in positions to be rotated selectively into axial alignment with the abutment elements upon rotation of the turret, a selector shaft extending from the dial housing parallel to the axis of the abutment elements, means slidably keying the turret to said selector shaft for rotation of the turret with the shaft and lineal movement of the turret along the shaft, a selector dial rotatably mounted in said dial housing, and driving means connecting the dial to said selector shaft for rotating the shaft and turret in response to the rotation of the dial, thereby to align said incremental measuring rods selectively with the axis of the normally spaced abutment elements, the aligned measuring rod being slidable into endwise engagement with the abutments upon movement of the movable element and turret toward the dial housing, the aligned measuring rod thereby locating the movable element relative to the stationary element.

17. In a dial operated measuring apparatus for locating a lineally movable machine element relative to a stationary element, said measuring apparatus comprising a dial housing mounted on the stationary element, an abutment element mounted relative to the dial housing, a turret mounting element spaced from the dial housing, releasable slide means connecting the turret mounting element to the movable element and providing adjustment thereof along the line of motion of the movable element, said turret mounting element having a pair of arms spaced apart from one another along the line of motion of the movable machine element, a second abutment element mounted in one of said arms in axial alignment with said first abutment element and normally spaced therefrom, a turret rotatably mounted between the arms of said turret mounting element and residing between said abutment elements, said turret confined endwisely between said arms for lineal movement with the movable machine element, a set of incremental measuring elements mounted in said turret, said measuring elements spaced apart in a circle passing through the axis of the abutment elements in positions to be rotated selectively into axial alignment with the abutment elements upon rotation of the turret, a selector shaft extending from the dial housing parallel to the axis of the abutment elements, means slidably keying the turret to said selector shaft for rotation of the turret with the shaft and lineal movement of the turret along the shaft, whereby the turret is adjustable lineally along the movable element relative to the abutment element of the dial housing upon release of said slide means to locate the movable element to a reference position relative to the abutment element of the dial housing, a selector dial rotatably mounted in said dial housing, and driving means connecting the dial to said selector shaft for rotating the shaft and turret in response to the rotation of the dial, thereby to align said incremental measuring rods selectively with the axis of the spaced abutment elements to provide a measurement therebetween to locate the movable element relative to the reference position.

18. In a selective measuring apparatus having a pair of abutment elements normally spaced apart for relative movement along a common axis, an elongated support element, a series of spaced rocker arms pivotally mounted on the support element along an axis parallel to the axis of the abutment elements, the rocker arms having swinging ends movable in an arc transversely through the axis of the abutment elements, a series of measuring rods mounted in the swinging ends of the rocker arms, said rocker arms and rods normally residing in an inactive coaxial relationship along an axis spaced transversely from the axis of the abutments, in a position remote from the path of relative lineal movement of the abutment elements along said common axis, said coaxial rods collectively having a length less than the normal spacing of the abutment elements, one of said abutment elements being movable lineally along a path spaced transversely from the measuring rods which reside in said inactive coaxial relationship and individual actuating means connected to the rocker arms of the respective measuring rods for swinging the rocker arms and measuring rods individually through said arc into alignment with the axis of the abutment elements, thereby shifting the measuring rods selectively into aligned relationship with one another between the normally spaced abutment elements, the aligned measuring rods collectively providing a length measurement between the abutment elements upon relative movement thereof toward one another.

19. In a selective measuring apparatus having a pair of abutment elements normally spaced apart for relative movement along a common axis, an elongated support element, a series of spaced rocker arms pivotally mounted on the support element along an axis parallel to the axis of the abutment elements, the rocker arms having swinging ends movable in an arc transversely through the axis of the abutment elements, a series of measuring rods mounted in the swinging ends of the rocker arms, said rocker arms and rods normally residing in an inactive coaxial relationship along an axis spaced transversely from the axis of the abutments, said coaxial rods collectively having a length less than the normal spacing of the abutment elements, individual actuating means connected to the rocker arms of the respective measuring rods for swinging the rocker arms and measuring rods through said arc into alignment with the axis of the abutment elements, a selector dial rotatably mounted relative to the elongated support element, a rotatable driving system connected to the selector dial, the driving system having a series of selector elements rotatable about a common axis, one for each measuring rod, said selector elements respectively engageable with the actuating means of the rocker arms to swing the rocker arms through said arc, said selector elements spaced angularly from one another about said common axis, said selector elements sequentially engaging the actuating means of the rocker arms upon rotation of the selector dial, thereby shifting the measuring rods selectively into aligned relationship with one another between the normally spaced abutment elements, the aligned measuring rods collectively providing a length measurement between the abutment elements in response to the degree of rotation of the selector dial.

20. In a dial operated measuring apparatus having a pair of spaced abutment elements, movable lineally relative to one another along a common axis, a dial housing, a control unit mounted adjacent one end of the dial housing, one of said abutment elements being slidably mounted in said control unit and having an end portion projecting into the dial housing, a plurality of rotatable selector dials mounted upon a second common axis within said dial housing and residing adjacent one another between the spaced abutment elements, each of said dials having a series of bores residing on axes parallel to said common axis of the abutment elements, the bores of each dial being spaced apart in a common circle which passes through the common axis of the abutment elements, a respective set of measuring rods slidable freely in the bores of each dial, the measuring rods of each set having graduated lengths in a different order of increments, the individual rods of each set being shifted selectively into axial alignment with one another between said spaced abutment elements upon relative rotation of the selector dials to provide a length measurement between the spaced abutment elements equal to the additive lengths of the axially aligned measuring rods, spring means normally urging the abutment element of the control unit axially toward one end of the axially aligned measuring rods, and stop means secured upon said spring urged abutment element, said stop means normally urged against the control unit under predetermined pressure by said spring means and limiting the movement of the abutment element toward one end of the axially aligned measuring rods with the end of the abutment element spaced therefrom, the measuring rods being urged endwisely against one another and against the spring urged abutment element by engagement of the other abutment element against the opposite end of the aligned measuring rods upon lineal motion of the measuring elements toward one another, said measuring rods providing said additive length measurement under the predetermined pressure provided by said spring means.

References Cited in the file of this patent

UNITED STATES PATENTS

| | | |
|---|---|---|
| 1,452,834 | Fuchs | Apr. 24, 1923 |
| 1,580,255 | Summers | Dec. 25, 1951 |
| 2,592,433 | Knosp et al. | Apr. 8, 1952 |
| 2,604,000 | Kjellberg | July 22, 1952 |